United States Patent
Lerios et al.

(10) Patent No.: US 10,169,433 B2
(45) Date of Patent: Jan. 1, 2019

(54) SYSTEMS AND METHODS FOR AN SQL-DRIVEN DISTRIBUTED OPERATING SYSTEM

(71) Applicant: MICROSOFT TECHNOLOGY LICENSING, LLC, Redmond, WA (US)

(72) Inventors: Apostolos Lerios, Austin, TX (US); Theodore Vassilakis, Los Altos, CA (US); Patrick An Phu Nguyen, Palo Alto, CA (US); David Kryze, Mountain View, CA (US); Sreenivasa Viswanadha, Cupertino, CA (US); Eric Karlson, Alameda, CA (US); Laurent An Minh Nguyen, Lausanne (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 282 days.

(21) Appl. No.: 14/810,144

(22) Filed: Jul. 27, 2015

(65) Prior Publication Data
US 2016/0034547 A1    Feb. 4, 2016

Related U.S. Application Data

(60) Provisional application No. 62/030,552, filed on Jul. 29, 2014.

(51) Int. Cl.
G06F 17/00  (2006.01)
G06F 17/30  (2006.01)

(52) U.S. Cl.
CPC .. *G06F 17/30563* (2013.01); *G06F 17/30454* (2013.01); *G06F 17/30592* (2013.01); *G06F 17/30595* (2013.01)

(58) Field of Classification Search
None
See application file for complete search history.

(56) References Cited

U.S. PATENT DOCUMENTS

| 4,841,436 A | 6/1989 | Asano |
| 6,785,668 B1 | 8/2004 | Polo et al. |

(Continued)

FOREIGN PATENT DOCUMENTS

| CN | 101218803 A | 7/2008 |
| CN | 102461026 A | 5/2012 |

(Continued)

OTHER PUBLICATIONS

Office Action dated Mar. 8, 2017 issued in U.S. Appl. No. 14/486,995.

(Continued)

*Primary Examiner* — Hung D Le
(74) *Attorney, Agent, or Firm* — Workman Nydegger

(57) ABSTRACT

Various embodiments can include systems, methods, and non-transitory computer readable media configured to receive at least one operation to be performed using (i) first data that is managed by a first computing system and (ii) second data that is managed by a second computing system, the operation being received through an interface provided by the computing system, and wherein the operation is based at least in part on a Structured Query Language (SQL). At least one optimization can be performed based at least in part on the operation. The operation can be executed using at least the first data and the second data. A result generated can be provided upon executing the operation through the interface provided by the computing system. The computing system, the first computing system, and the second computing system are each able to concurrently process, access, and create at least a portion of the generated result.

17 Claims, 6 Drawing Sheets

(56) References Cited

U.S. PATENT DOCUMENTS

| | | | |
|---|---|---|---|
| 7,668,798 B2* | 2/2010 | Scanlon | G06F 17/30604 707/713 |
| 7,707,141 B1* | 4/2010 | Outhred | G06F 17/30595 707/713 |
| 7,765,259 B2 | 7/2010 | MacVarish | |
| 8,200,594 B1 | 5/2012 | Bleiweiss | |
| 8,645,386 B2* | 2/2014 | Hess | G06F 17/30545 707/740 |
| 2003/0065648 A1 | 4/2003 | Driesch et al. | |
| 2004/0088406 A1 | 5/2004 | Corley et al. | |
| 2004/0128276 A1* | 7/2004 | Scanlon | G06F 17/30604 |
| 2004/0181378 A1* | 9/2004 | Gilmore | G06Q 10/06 703/6 |
| 2005/0119988 A1* | 6/2005 | Buch | G06F 9/50 |
| 2006/0143171 A1 | 6/2006 | Doerre et al. | |
| 2006/0164990 A1 | 7/2006 | Bhushan et al. | |
| 2006/0218129 A1 | 9/2006 | Muras | |
| 2007/0006294 A1 | 1/2007 | Hunter | |
| 2007/0087756 A1 | 4/2007 | Hoffberg | |
| 2007/0094171 A1 | 4/2007 | Burges et al. | |
| 2007/0266134 A1 | 11/2007 | Shyy et al. | |
| 2007/0299836 A1 | 12/2007 | Hou et al. | |
| 2008/0065455 A1 | 3/2008 | Sun et al. | |
| 2008/0114752 A1* | 5/2008 | Friesenhahn | G06F 17/30448 |
| 2008/0154844 A1 | 6/2008 | Gao et al. | |
| 2008/0250401 A1 | 10/2008 | Puri et al. | |
| 2008/0301136 A1 | 12/2008 | De et al. | |
| 2009/0083219 A1 | 3/2009 | Zane et al. | |
| 2010/0058289 A1 | 3/2010 | Hudson | |
| 2010/0079336 A1 | 4/2010 | Skibiski et al. | |
| 2010/0095269 A1 | 4/2010 | Bouillet et al. | |
| 2010/0199069 A1 | 8/2010 | Kim et al. | |
| 2010/0235296 A1 | 9/2010 | Nakazato | |
| 2010/0278158 A1 | 11/2010 | Lee et al. | |
| 2011/0107273 A1 | 5/2011 | Ranganathan et al. | |
| 2011/0213778 A1* | 9/2011 | Hess | G06F 17/30545 707/740 |
| 2011/0320433 A1* | 12/2011 | Mohiuddin | G06F 17/30451 707/714 |
| 2012/0030244 A1 | 2/2012 | John | |
| 2012/0047158 A1 | 2/2012 | Lee et al. | |
| 2012/0155277 A1 | 6/2012 | Jain et al. | |
| 2012/0159304 A1 | 6/2012 | Listou | |
| 2013/0006888 A1 | 1/2013 | Mesika et al. | |
| 2013/0024484 A1 | 1/2013 | Banerjee et al. | |
| 2013/0054649 A1 | 2/2013 | Potapov et al. | |
| 2013/0073573 A1 | 3/2013 | Huang et al. | |
| 2013/0159285 A1* | 6/2013 | Dees | G06F 17/30466 707/718 |
| 2013/0204811 A1 | 8/2013 | Morinaga et al. | |
| 2013/0212255 A1 | 8/2013 | Chao et al. | |
| 2013/0262443 A1 | 10/2013 | Leida et al. | |
| 2014/0089252 A1 | 3/2014 | Bhide et al. | |
| 2014/0101083 A1 | 4/2014 | Nicholson et al. | |
| 2014/0172833 A1 | 6/2014 | Taylor | |
| 2014/0188841 A1 | 7/2014 | Sun et al. | |
| 2014/0214880 A1 | 7/2014 | Chi et al. | |
| 2014/0297353 A1 | 10/2014 | Srivastava | |
| 2015/0081701 A1 | 3/2015 | Lerios et al. | |
| 2015/0304198 A1 | 10/2015 | Angelov et al. | |
| 2016/0034529 A1 | 2/2016 | Nguyen et al. | |
| 2016/0034530 A1 | 2/2016 | Nguyen et al. | |
| 2017/0032016 A1* | 2/2017 | Zinner | G06Q 10/063 |
| 2017/0206256 A1* | 7/2017 | Tsirogiannis | G06F 17/30563 |

FOREIGN PATENT DOCUMENTS

| | | |
|---|---|---|
| CN | 103136217 A | 6/2013 |
| WO | 2006036127 A1 | 4/2006 |

OTHER PUBLICATIONS

Bouillet, et al., "A Tag-Based Approach for the Design and Composition of Information Processing Applications", In Proceedings of the 23rd ACM SIGPLAN Conference on Object-Oriented Programming Systems Languages and Applications, vol. 43, Issue 10, Sep., 2008, pp. 585-602.

Wongsuphasawat, et al., "Exploring Flow, Factors, and Outcomes of Temporal Event Sequences with the Outflow Visualization", In proceedings of IEEE Transactions on Visualization and Computer Graphics, vol. 18, Issue 12, Oct. 9, 2012, pp. 2659-2668.

"Extended Search Report Issued in European Patent Application No. 14843834.4", dated Apr. 18, 2017, 10 Pages.

U.S. Appl. No. 61/878,562, filed Sep. 16, 2013, Lerios et al.

U.S. Appl. No. 62/030,552, filed Jul. 29, 2014, Lerios et al.

U.S. Appl. No. 62/184,095, filed Jun. 24, 2015, Cutler et al.

U.S. Appl. No. 62/030,558, filed Jul. 29, 2014, Nguyen et al.

U.S. Appl. No. 62/030,560, filed Jul. 29, 2014, Nguyen et al.

"International Application No. PCT/US2014/055699, International Search Report and Written Opinion", dated Dec. 8, 2014.

"International Search Report & Written Opinion Issued in PCT Application No. PCT/US2015/042529", dated Oct. 23, 2015, 9 Pages.

"Written Opinion Issued in PCT Application No. PCT/US2015/042535", dated Oct. 23, 2015, 8 Pages.

"Second Written Opinion Issued in PCT Application No. PCT/US2015/042538", dated Nov. 3, 2015, 7 Pages.

Office Action dated Dec. 15, 2016 issued in U.S. Appl. No. 14/486,995.

Office Action dated Nov. 30, 2017 cited in U.S. Appl. No. 14/865,995.

Office Action dated Sep. 8, 2017 cited in U.S. Appl. No. 14/807,822.

Office Action dated Sep. 25, 2017 cited in U.S. Appl. No. 14/807,807.

"Non Final OFfice Action Issued in U.S. Appl. No. 14/486,995", dated Nov. 30, 2017, 23 Pages.

"Office Action Issued in U.S. Appl. No. 14/486,995", dated Jun. 14, 2018, 25 Pages.

"Office Action Issued in U.S. Appl. No. 14/807,822", dated May 2, 2018, 37 Pages.

"Office Action Issued in CN Patent Application No. 201480062689.9", dated Jun. 21, 2018, 16 Pages.

* cited by examiner

SYSTEMS AND METHODS FOR AN SQL-DRIVEN DISTRIBUTED OPERATING SYSTEM

CROSS-REFERENCE TO RELATED APPLICATIONS

The present applications claims priority from U.S. Provisional Patent Application Ser. No. 62/030,552, filed Jul. 29, 2014, entitled "Systems and Methods for SQL-Driven Distributed Operating System", which is incorporated herein by reference.

FIELD OF THE INVENTION

The present technology relates to accessing and/or processing data. More particularly, the present technology relates to approaches for accessing and/or processing various data using distributed sources.

BACKGROUND

Businesses typically generate vast amounts of data through their day-to-day activities. Such business data can be analyzed to discover meaningful insights about a business, for example. However, accessing and analyzing such business data can be challenging and time-consuming. For example, a business may utilize data that is stored in different types of databases (e.g., relational or SQL-based databases versus NoSQL-based databases). In another example, the business may also utilize data that is stored in various files (e.g., records, logs, documents, etc.) and/or media objects (e.g., audio, video, etc.). These files may each utilize a different file format and/or structure, thereby creating incompatibilities among the different types of data. Further, since different teams may be restricted to certain data, in some instances, such data may be segregated in different silos, which can create difficulties in combining and analyzing data.

SUMMARY

Various embodiments of the present disclosure can include systems, methods, and non-transitory computer readable media configured to receive at least one operation to be performed using (i) first data that is managed by a first computing system and (ii) second data that is managed by a second computing system, the operation being received through an interface provided by the computing system, and wherein the operation is based at least in part on a Structured Query Language (SQL). At least one optimization can be performed based at least in part on the operation. The operation can be executed using at least the first data and the second data. A result generated can be provided upon executing the operation through the interface provided by the computing system. The computing system, the first computing system, and the second computing system are each able to concurrently process, access, and create at least a portion of the generated result.

In an embodiment, the first data is associated with a SQL database type, and wherein the second data is associated with a NoSQL database type.

In an embodiment, the first data and the second data correspond to at least one of: a text file, a log file, a document file, an image file, an audio file, a video file, a spreadsheet file, an information source, or an information sink.

In an embodiment, an Extract, Transform, Load (ETL) process is performed using the first data and the second data.

In an embodiment, a subset of data of the first data and the second data is created based at least in part on the ETL process.

In an embodiment, computation on a result of the ETL process using the first data and the second data is performed.

In an embodiment, the first data is a first database table associated with a first database type, and wherein the second data is a second database table associated with a second database type, and wherein the first database table managed by the first computing system and the second database table managed by the second computing system are joined.

In an embodiment, at least one second operation is received to modify the joined first database table and the second database table and a new database table is created based at least in part on the modification of the joined first database table and the second database table, wherein the new database table is stored in a local data store managed by the computing system.

In an embodiment, at least one third operation is received to modify the joined first database table and the second database table and the new database table stored in the local data store managed by the computing system is modified.

In an embodiment, the first data is a first database table associated with a first database type, and wherein the second data is a text file (e.g., comma separated values (CSV) file), and the first database table and the text file are joined.

In an embodiment, the result is a database table, and wherein providing, by the computing system, the result further comprises providing the result through the interface, the result being a tabular representation of the database table.

In an embodiment, the operation performs at least in part a user-defined function (UDF) with at least one of the first computing system and the second computing system, wherein at least one of the first computing system and the second computing system is remote from the computing system.

In an embodiment, a table schema is inferred based at least in part on the first data, the second data, or both.

In an embodiment, a script that includes the at least one operation is created in response to a request by a user that provided the operation.

In an embodiment, the computing system, the first computing system, and the second computing system are at least one of: a server, a mobile computing device, a computing system having varying access to network connectivity, a virtualized computing system, a non-virtualized computing system, embedded computing system, or special-purpose computing system.

In an embodiment, a first operation and a second operation to be performed by the computing system are received, at least one optimization with respect to the first operation is performed, the first operation is executed, while the first operation is executing, at least one optimization with respect to the second operation is performed, and the second operation is executed.

In an embodiment, the operation is translated into a single native code representation.

In an embodiment, the single native code representation of the operation is optimized, wherein the optimization includes at least one of: register allocation, loop unrolling, inlining, or constant folding.

Many other features and embodiments of the invention will be apparent from the accompanying drawings and from the following detailed description.

Figure 1:
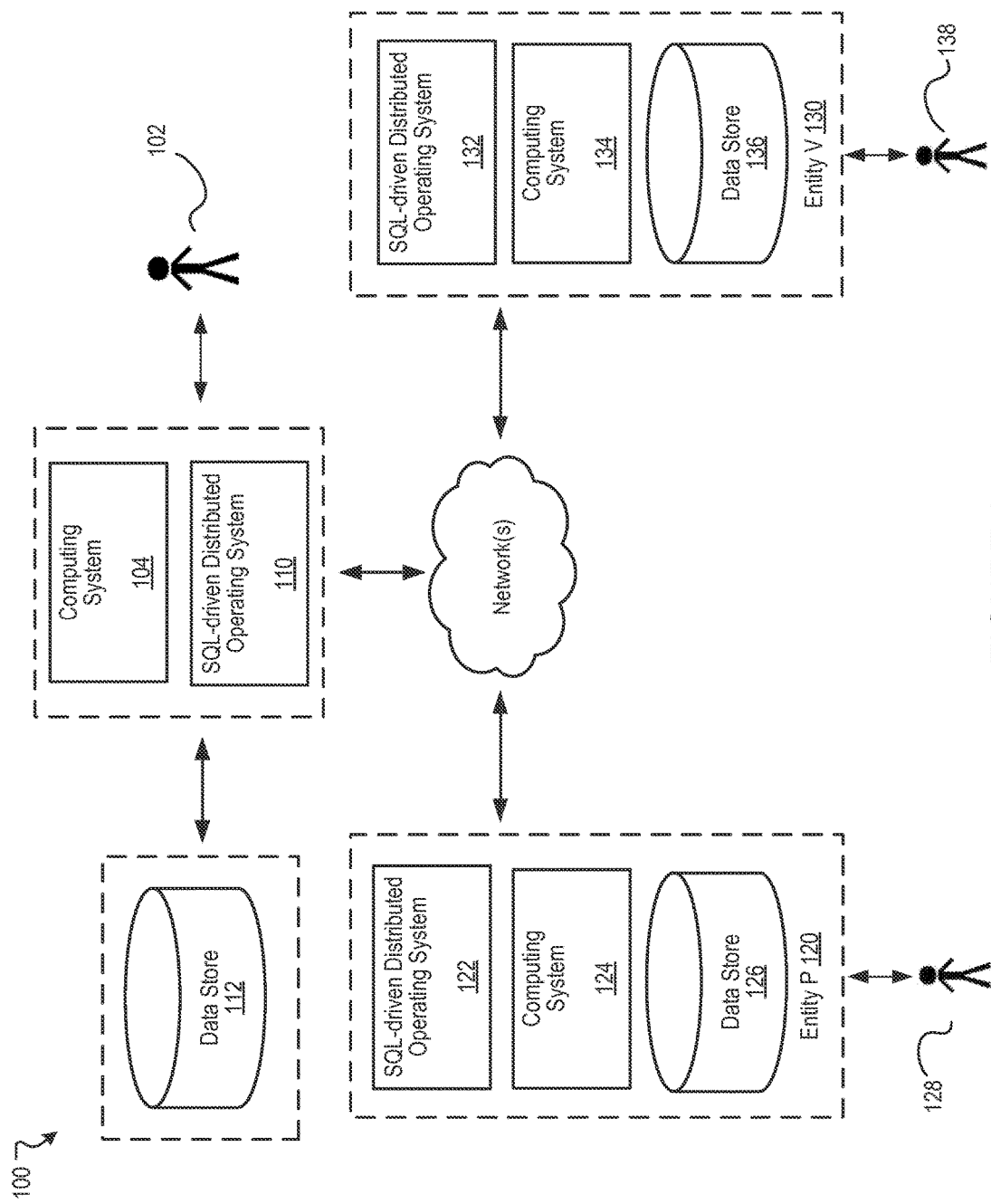
FIG. 1 illustrates an example system, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

SQL-Driven Distributed Operating System

Conventional systems, for example, Relational Database Management Systems (RDBMSs), provide for storage, retrieval, and analysis of information using SQL. However, such conventional systems typically require that information stored outside the RDBMS be first imported into the RDBMS-controlled storage prior to being analyzed using SQL. In various embodiments, the present disclosure addresses these and other drawbacks associated with conventional techniques. For example, the present disclosure provides techniques for utilizing an SQL-driven distributed operating system that can operate on data in situ and without requiring data stored in different resources be imported, for example, into a local store managed by the SQL-driven distributed operating system. Such different sources of data can include different types of databases, files, media objects, that may or may not be segregated in different data silos. Thus, the approaches described herein can be used to easily access, manipulate, and/or combine data (e.g., databases, records, logs, documents, media) in tables, for example, without having to move, or re-locate, the data into a centralized system.

In another example, conventional systems provide for storage and retrieval of image files but most such systems typically do not use SQL for retrieval. Instead, such systems typically employ custom languages and implement retrieval operations by allowing queries to be made against image metadata (i.e., textual information stored within the file, but independently of the file's visual content or pixels). In various embodiments, the SQL-driven distributed operating system can utilize SQL to retrieve images based on their visual content and/or metadata, or even criteria defined against a completely separate data source yet expressed within the same SQL query. Further, conventional systems can provide for storage and retrieval of audio and video files. Again, most conventional systems typically do not use SQL for retrieval and instead employ custom languages. Further, most conventional systems implement retrieval operations by allowing queries against audio and/or file metadata (i.e., textual information stored within the file, but independently of the file's audio or video content or frames). In various embodiments, the SQL-driven distributed operating system can utilize SQL to retrieve audio and video based on their auditory and/or visual content, auxiliary streams (e.g., subtitles), and/or metadata, or even criteria defined against a completely separate data source yet expressed within the same SQL query.

Generally, conventional systems tend to fall into one or more categories based on their functional purpose, which is partly an outcome of their technological architecture being best suited for specific tasks. For example, Extract, Transform, Load (ETL) systems typically concern themselves with moving large amounts of data and typically operate offline (e.g., batch jobs). During transfer, they can convert the data from the format(s) of the data source(s) to the format(s) of their associated sink(s), and may allow for additional, custom transformations. To accommodate this functionality, such systems may provide custom transformation languages and be tuned to efficient use of network bandwidth but without regard to latency. In another example, in-memory (InMem) (or real-time) systems can be low-latency systems serving content to interactive applications. Given that the form of queries (i.e., overall query structure, without regard to specific parameter values) such systems receive is highly predictable (as the application dictates that form), an InMem system may optimally rearrange or index data sources to serve those specific queries, but perform very poorly on data that does not fit in memory or on queries with previously unseen forms. Ad hoc systems are conventional systems where the user may compose and execute arbitrary queries, review their analysis results, craft follow-up queries, and engage in this cycle of interactive exploration for many iterations and over long periods of time. To facilitate this workflow for pattern discovery or data analysis, ad hoc systems can provide an easy-to-use interface and query language, and offer low latency, but may be unable to handle large volumes of data and, therefore, may sample the raw data instead. Other conventional systems include business Intelligence (BI) systems that can help users gain insights into their business data. This broad category of tools can include, in part, popular spreadsheet or visualization tools, as well as back-end systems that may process unstructured data (e.g., newspaper articles or SEC filings) to turn them into a structured format that can be analyzed using the tools mentioned above. Cleanup tools (e.g., standardizing lists of addresses so that they all have a correct zip code) may also fall into this category.

In various embodiments, the SQL-driven distributed operating system defies such categorization and is capable of doing all of the tasks that would typically be performed by the above-mentioned conventional systems in a single architecture, application, and/or environment. For example, various configuration parameters can guide the SQL-driven distributed operating system to prioritize network bandwidth or latency, or balance use of different levels of the memory hierarchy (e.g., caches, RAM, solid state drives, hard disks, storage attached network) by the SQL-driven distributed operating system. The extended SQL utilized by the SQL-driven distributed operating system can provide a high degree of expressivity to perform ETL without requiring a custom transformation language. In various embodiments, the ETL process can also be performed by the SQL-driven distributed operating system. In some embodiments, the ETL process can be utilized to create subsets of data from other data sources (e.g., software-defined data marts). These subsets of data can be, but need not be, copied, for example, to a local data store. In some embodiments, computations can be performed on results of the ETL process. Further, the SQL-driven distributed operating system can also enable the composition of intuitive ad hoc queries. The SQL-driven distributed operating system can also provide visualization tools and a workspace for interactive exploration, as well as connectors to third-party tools which may use the SQL-driven distributed operating system for back-end BI tasks. The UDF library associated with the SQL-driven distributed operating system can encompass BI UDFs, and can be further extended as necessary to cover unique customer needs. Moreover, a single distributed operating system may act in more than one capacity at the same time thanks to the ability of the SQL-driven distributed operating system to learn and adapt to its operating environment. For example, the SQL-driven distributed operating system can detect that a certain query form is used with a high frequency and automatically adjust its storage of data and execution method so that it behaves as an InMem system for that query form, while concurrently using different execution methodologies for (non-repeatable) ad hoc queries. As used herein, the term "concurrent" can refer to operations that are performed simultaneously or near simultaneously or within a threshold amount of time from one another.

Extending the above point further, conventional systems can tend to capture a single slice, or a small handful of slices, of data sources and sinks including, for example, shape: flat/scalar data vs. nested/repeated fields; structure: records vs. multi-structured and unstructured documents and files, such as website logs, machine logs, call center Interactive Voice Response (IVR) files, email, etc.; size: small (few gigabytes, single server) to very large (trillions of records, petabytes, thousands of servers); storage: data warehouse, RDBMS, no-SQL, the web, and other sources and sinks across and outside the user's organization; and location: on-premises, on-cloud, or hybrid. In various embodiments, the SQL-driven distributed operating system is able to access and operate on all of such data sources and sinks and, further, the SQL-driven distributed operating system is not limited to a single slice nor a small handful of slices.

The SQL-driven distributed operating system may also be used to perform operations that, currently, require custom software and which require said software to employ and implement complex infrastructure algorithms to support distributed execution. For example, an initiative by Search for ExtraTerrestrial Intelligence (SETI) used a freely downloadable application for personal computers, which executed when the computer was idle, and which downloaded from a central database a subset of to-be-analyzed radio signals, attempted to locate non-random patterns indicative of alien transmissions, and reported its findings back to the central database. In various embodiments, an application written on top of the SQL-driven distributed operating system may achieve the same outcome with little effort. That is, there is no need for the application author to worry about accessing a central database using custom means. Rather, the application may access tables provided by the SQL-driven distributed operating system using SQL. Moreover, the computation can be expressed in Jython, and then run on Macs, PCs, iPhones, iPads, and any other computing platform where the SQL-driven distributed operating system may be installed, without requiring custom installers on the part of the application's author. In another example, some digital currencies, such as bitcoin, come into existence via a mining algorithm, which is a search for some large numbers (the bitcoins) meeting some desirable criteria over a vast search space. Like SETI, a large number of collaborating individuals may make their computers available to a mining process. Unlike SETI, this collaboration is intended to produce a profit for the participants, who share in the value of the discovered bitcoins in proportion to the amount of mining their computers did (i.e., in proportion to their computer's individual effort contributed towards the team's success; not in proportion to their individual discoveries). Therefore, while the record-keeping needs can be more demanding in this application than in the SETI application, the complexity of doing such record-keeping can be fully managed by the SQL-driven distributed operating system using simple SQL commands, leaving the mining application to focus on its unique mining algorithm. In some instances, file sharing applications contrast the above applications in that they do not concern themselves with computation but rather focus on data movement. Specifically, file sharing applications provide a mechanism for participating users to exchange files efficiently. The efficiency of such file sharing applications can be derived from maintaining awareness of multiple replicas of a file. That is, if a user wishes to receive a copy of a file they do not possess, the user can receive it simultaneously from all users who do possess it (in full or in part). Moreover, some file sharing systems do not provide a search mechanism to help locate a desired file. In various embodiments, the SQL-driven distributed operating system addresses all of the above elements of file sharing, and, in fact, it does so to such an extent that a file sharing application need only focus on its user interface instead of the underlying mechanics. That is, the SQL query capabilities of the SQL-driven distributed operating system can be used to identify desired data sources (files). Also, because the SQL-driven distributed operating system is aware of replication of its data sources and its optimizer is aware of both data location and network bandwidth, the SQL-driven distributed operating system may make a local disk copy of a remote data source efficiently using a command similar to the trivial standard SQL command:

```
CREATE TABLE my.centos_distro AS
SELECT * FROM shared.centos_distro;
```

Thus, the approaches provided above, and throughout the present disclosure, describe some of the many applications of the SQL-driven distributed operating system that address the various limitations and/or drawbacks that are typically associated with conventional systems and techniques.

FIG. 1 illustrates an example system 100, according to an embodiment of the present disclosure. The system 100 includes a user 102 operating a computing system 104. The example system 100 also includes a distributed operating system 110 that can provide access to, storage of, arbitrary computation upon (including analysis of), and transmission of, information that is stored in, transmitted through, and otherwise handled through various computing systems (e.g., the computing system 104) and/or data stores. The SQL-driven distributed operating system 110 can be implemented using a variety of different approaches. For example, the SQL-driven distributed operating system 110 can be configured to run through computing systems on which the SQL-driven distributed operating system 110 is installed. In the example of FIG. 1, the SQL-driven distributed operating system 110 is configured to run through a virtual machine instance running on the computing system 104 (e.g., computing device). The computing system 104 may be associated with distinct networks (e.g., on-premises computing systems, cloud computing systems, hybrid computing systems, public computing systems, private computing systems, etc.). The computing system 104 may also have access to distinct local data (e.g., data store 112) and/or data available through networks (e.g., data store 126, 136). Further, the computing system 104 can provide distinct computing capabilities along both technical dimensions (e.g., various central processing units (CPUs) and/or graphics processing units (GPUs)) or non-technical dimensions (e.g., use of human subjects speaking and recording phrases). The user 102 operating the computing system 104 can configure the SQL-driven distributed operating system 110 to target any data (e.g., data store 112, 126, 136) for access to, or arbitrary computation upon, and the SQL-driven distributed operating system 110 can perform the requested operations such that the user 102 need not be aware of the physical location of the data and/or the computing resources.

In some embodiments, a separate instance of the SQL-driven distributed operating system 122 can be running on a computing system 124 associated with an entity P 120 and a separate instance of the SQL-driven distributed operating system 132 can be running on a computing system 134 (e.g., cloud datacenter) associated with the entity V 130. The SQL-driven distributed operating systems 122, 132 can be configured to operate in the same manner as the SQL-driven distributed operating system 110. In various embodiments, the computing systems 104, 124, 134 can operate as a distributed system that can each concurrently process, access, and/or create at least a portion of a generated result.

In various embodiments, the user 102 operating the computing system 104 can interact with the SQL-driven distributed operating system 110 through an interface. The interface can be, for example, an application programming interface (API), which may be built using standard communication technologies (e.g., Apache Thrift) and/or a graphical user interface (GUI), such as a software application (e.g., a web-based application) running on the computing system 104. The user 102 can access a workspace through the interface which allows the user 102 to operate the SQL-driven distributed operating system 110, for example, by providing commands (e.g., SQL commands) that can be executed by the SQL-driven distributed operating system 110. Using the workspace, the user 102 can also access the output of any commands executed through the SQL-driven distributed operating system 110 including, for example, any potential errors encountered and/or data received. The output can be provided by the interface in various formats, such as in a tabular format and/or a visual format, to provide some examples. In some instances, the interface can incorporate aspects of a terminal and/or an Integrated Development Environment (IDE) such that the interface can facilitate the storage and/or retrieval of multiple commands and their respective outputs, as well as annotation of commands and/or groups of commands. In some instances, the commands provided by the user 102 to the SQL-driven distributed operating system 110 can be included in a script (e.g., an executable script containing one or more instructions) and this script can be shared with other users of the SQL-driven distributed operating system 110. Access to the SQL-driven distributed operating system 110 can also be provided through industry standard interfaces for accessing SQL and/or non-SQL based systems. Some examples of such interfaces include, for example, Open Database Connectivity (ODBC), Java Database Connectivity (JDBC), and Open Data Protocol (OData).

In some embodiments, various authentication measures may be utilized to regulate access to and/or by the SQL-driven distributed operating system 110. For example, the user 102 may need to provide appropriate login credentials before being able to access the SQL-driven distributed operating system 110. Similarly, the SQL-driven distributed operating system 110 can be configured with appropriate credentials and/or access rights so that the SQL-driven distributed operating system 110 can access resources, such as the data stores 112, 126, 136. Activities, or operations, performed by the SQL-driven distributed operating system 110 and/or activities, or operations, performed by the user 102 with respect to the SQL-driven distributed operating system 110, can be logged and monitored. In some embodiments, such activities or operations can be analyzed using the SQL-driven distributed operating system 110 or through a data visualization engine.

In various embodiments, when interacting with the SQL-driven distributed operating system 110, the user 102 can utilize an extension of the Structured Query Language (SQL) to select the data, or information, to be accessed, stored, computed, and/or transmitted, as well as to control aspects of the SQL-driven distributed operating system 110. The SQL-driven distributed operating system 110 can be configured to operate using various types of data, or information, including, for example, traditional database data (e.g., tables having columns of simple, scalar, types, such as text and/or numbers), local and/or remote files (e.g., files that contain text, images, audio, video, spreadsheets, or other formats), live information sources (e.g., sensors, computer state indicating, for example, a number of users logged into a computing system, memory in use, etc.) and data sinks, such as live information sinks (e.g., actuators, switches, devices that transform computer instructions into real-world action such as home automation devices, etc.).

In various embodiments, the SQL-driven distributed operating system 110 can be configured to employ various optimizations to perform operations efficiently. These optimizations can utilize optimized execution engines including, for example, Just-In-Time (JIT) compilation. Additionally, the SQL-driven distributed operating system 110 can also account for factors including, for example, user-specified information regarding data sources and data sinks, such as the availability of replicas of such sources and/or sinks. Another factor can include dynamically deducing information regarding the state and performance of various resources, such as local network outages and/or bottlenecks. The SQL-driven distributed operating system 110 can also be configured to evaluate, and operate with respect to, business rules, for example, business rules that specify user priorities. The SQL-driven distributed operating system 110 can also be configured to analyze past usage patterns of resources (e.g., system resources such as CPUs, GPUs, networks, data stores 112, 126, 136, etc.) and use this information for optimizing operations. Such analysis can include, for example, analyzing daily business cycles for worldwide operations as different regions come online. In another approach for optimizing operations, the SQL-driven distributed operating system 110 can utilize knowledge, for example, with some threshold amount certainty, of future events that are expected to occur. For example, the SQL-driven distributed operating system 110 can utilize knowledge of scheduled nightly queries and their respective system impact.

As mentioned, the SQL-driven distributed operating system 110 can access and perform various operations using data from disparate sources. An example scenario will be used to describe the various operations with respect to the example system 100 of FIG. 1. For example, the user 102 operating the computing system 104 may be interacting with the SQL-driven distributed operating system 110 to perform operations with respect to data associated with an entity "P" 120 and data associated with an entity "V" 130. The entity P 120 may be an auto parts supplier that makes parts for vehicles that are manufactured by the entity V 130. Each part made by the entity P 120 can be associated with a respective universal product code (UPC), which is a short integer number, and a respective UPC bar code, which is a visual representation (e.g., image) of the part's UPC. In this example, each part is tagged with its UPC bar code. Further, each part can be used exactly once for each "pickup" vehicle. That is, in this example, if the same screw is used on all four wheels, then four instances of the screw can be considered different parts, each with its own distinct UPC.

In the example of FIG. 1, the data associated with the entity P 120 can be stored in one or more database instances that are remotely installed on the premises of the entity P's facility. This data can be accessed by the SQL-driven distributed operating system 110, for example, through the data store 126. In this example, the entity P 120 may be running its own instance of the SQL-driven distributed operating system 122, for example, on a computing system 124 associated with the entity P 120. Further, this data can include a table "parts" in which each row contains a part's unique UPC, manufacturing cost, description, and the vehicle component where the part is installed (e.g., engine, wheel, etc.). The data associated with the entity V 130 can be stored in one or more database instances that are remotely installed in a cloud datacenter 134 of the entity V 130. This data can be accessed by the SQL-driven distributed operating system 110, for example, through the data store 136. In this example, the entity V 130 may be running its own instance of the SQL-driven distributed operating system 132, for example, on a computing system associated with the entity V 130. Further, this data can include a table "pickup" that includes a list of UPCs of parts that are needed to manufacture the pickup vehicle.

In this example, the SQL-driven distributed operating system 110 can also be configured to access the storage area network of the entity P 120, which may provide access to text files that contain Material Safety Data Sheets (MSDS) of each auto part, image files which contain a photograph of each auto part's UPC bar code, and audio files which contain the spoken name of each auto part. The storage area network of the entity P 120 can also provide a comma separated values (CSV) file (e.g., "index.csv") which contains a list of rows where each row contains a part's unique UPC, the name of the text file containing the part's MSDS, the name of the image file containing the part's UPC bar code, and the name of the audio file containing the part's spoken name. Further, the storage area network of the entity P 120 can also provide access to a public website that provides a video file showing the assembly process of the pickup vehicle, a set of cameras installed at the factory at which the pickup vehicle is assembled that provide comprehensive views into every assembly step, and a local data store (e.g., data store 112) that can be a local hard drive on one of the computing systems on which the SQL-driven distributed operating system 110, or a different instance of the SQL-driven distributed operating system, is installed. The storage area network of the entity P 120 can also provide access to various data sinks, such as a switch installed in the assembly line of the pickup vehicle which, when activated, can route fully assembled vehicles in an area where they are to undergo inspection and repairs by human personnel. Further, the storage area network of the entity P can provide access to the cell phone number of an administrator user 128 of the entity P. Users can operate a distributed operating system (e.g., the SQL-driven distributed operating system 110) using an interface, such as a workspace provided by the SQL-driven distributed operating system.

Based on the accessible data sources and data sinks, as described above, the user 102 operating the computing system 104 can interact with the SQL-driven distributed operating system 110 to perform various operations, for example, through the workspace interface. In some embodiments, the SQL-driven distributed operating system 110 can be instructed to perform operations in response to various SQL commands that are provided by the user 102. For example, the user 102 can input, through the workspace, an SQL command "SELECT * FROM P.parts" to obtain a listing of parts that are made by the entity P 120. The SQL-driven distributed operating system 110 can obtain the listing through the one or more database instances that are remotely installed on the premises of the entity P's facility and that can be accessed through the data store 126, for example. Similarly, the SQL-driven distributed operating system 110 can be instructed to obtain a listing of parts (e.g., UPCs) that are available one or more database instances that are remotely installed in a cloud datacenter of the entity V 130 and that can be accessed through the data store 136, for example.

In some embodiments, the SQL-driven distributed operating system 110 can be instructed to copy the contents of one or more database tables from one database instance to a local data store (e.g., data store 112) managed by the SQL-driven distributed operating system. For example, the SQL-driven distributed operating system 110 can copy the contents of the database table "pickup" that is accessible through the data store 136 in response to an SQL command that is provided through the workspace. In some embodiments, the SQL-driven distributed operating system 110 can be instructed to modify any databases and/or tables that are, for example, stored on a local data store managed by the SQL-driven distributed operating system 110. For example, the user 102 can modify the database table "pickup" stored on the local data store (e.g., data store 112) managed by the SQL-driven distributed operating system 110. In this example, the user 102 can issue SQL commands, for example, through the workspace, to append a new entry to the table "pickup" to specify that an extra nut is to be added to the assembly of the engine for the pickup vehicle. The SQL-driven distributed operating system 110 can be configured to perform future operations that involve the "pickup" table against the augmented copy of the "pickup" table that is stored on the local data store, for example.

In some embodiments, the SQL-driven distributed operating system 110 can be instructed to obtain various data from databases and/or database tables. The obtained data can be viewed through the workspace, for example, in a tabular and/or visualized form. For example, the user 102 can instruct the SQL-driven distributed operating system 110 to analyze the contents of the "parts" table to count the number of parts per vehicle component. The resulting counts can be viewed through the workspace in a tabular form or a visual form (e.g., a pie chart) so that the relative concentration of parts made by the entity P 120 can easily be determined for each component of the pickup vehicle. In various embodiments, the SQL-driven distributed operating system 110 can determine, or infer, a table schema based on the sources of data (e.g., other databases, CSV files, etc.).

In various embodiments, the SQL-driven distributed operating system 110 can be configured to join database tables that may reside on disparate database instances or sources of data. For example, the user 102 can instruct the SQL-driven distributed operating system 110 to join the "parts" table, which is associated with a database instance corresponding to the entity P 120, and the "pickup" table, which is associated with a database instance corresponding to the entity V 130. In another example, the SQL-driven distributed operating system 110 can be instructed to join the "parts" table, the "pickup" table, and the CSV file index.csv, which is available through the storage area network of the entity P 120. Further, the SQL-driven distributed operating system 110 can also be instructed to retrieve the text files that contain Material Safety Data Sheets (MSDS) of each auto part and search for the keyword "mercury" within each file to generate a report that shows the parts which contain mercury and which may require special disclosure. The generated report, or data sheet, can be stored on the local data store managed by the SQL-driven distributed operating system 110, for example.

In some embodiments, the SQL-driven distributed operating system 110 can be configured to analyze media items obtained through data sources. For example, the SQL-driven distributed operating system 110 can analyze live images that are taken by the factory cameras to identify a respective UPC bar code of each part captured by the images. These identified UPC bar codes can be correlated against the collection of UPC bar code images that is available through the database instance corresponding to the entity P 120 and the CSV file index.csv to identify all parts that are being installed in the images captured by the factory cameras. The SQL-driven distributed operating system 110 can be configured to repeat or perform any of these example instructions at specified intervals or at scheduled times. For example, the SQL-driven distributed operating system 110 can identify all parts that are being installed in images captured by the factory cameras and, based on such identification, determine whether each vehicle being manufactured is composed of all of the parts that are listed in the "pickup" database table. In the event the SQL-driven distributed operating system 110 determines that a vehicle is missing one or more parts, the SQL-driven distributed operating system 110 can be configured to activate the assembly line switch to route the vehicle to an inspection and repair area, for example.

In another example, the SQL-driven distributed operating system 110 can be configured to retrieve the video showing the assembly process of the vehicle, extract its audio stream, and correlate the audio against the collection of part name audio files and the CSV file index.csv. The SQL-driven distributed operating system 110 can also annotate each frame where the narrator mentions the name of the part with a hyperlink pointing to the company's website, and store the resulting collection of frame numbers and hyperlinks in the local data store, for example, to be used for delivery to the website operator.

In various embodiments, the SQL-driven distributed operating system 110 can also perform various meta-operations. In one instance, such meta-operations can include modifying data access rights, or rules, for entities. For example, the administrator user 128 associated with the entity P 120 interact with the SQL-driven distributed operating system 110 to specify that certain cost information is to be accessible to users, or employees, associated with the entity P 120 but not to users, or employees, associated with the entity V 130. Further, the administrator user 128 can configure an SQL trigger that monitors access to the restricted information. The trigger can be configured to activate when unauthorized access to the restricted resources is established and, upon activating, the SQL-driven distributed operating system 122 can be configured to send a notification to the cell phone of the administrator user 128. In another example, the administrator user 128 may notice that the computing system 128 that is hosting a database instance (e.g., through data store 126) is operating slowly despite minimal use of the database by local users associated with the entity P 120. The administrator user 128 can interact with the workspace and/or a visualization interface associated with the SQL-driven distributed operating system 122 to view the number of queries that are being performed against the database by users associated with the entity V 130. The administrator user 128 can determine that an errant user 138 associated with the entity V 130 is running an legacy application which is unable to cache data from the database in its local data store, for example, due a disk failure, and was thus fetching data from the database continuously. In various embodiments, the user 138 associated with the entity V 130 may devise a sequence of SQL commands to effect any of the operations described above. For example, the user 138 can access a workspace associated with the SQL-driven distributed operating system 132 to author a script that includes a sequence of SQL commands. The script can then be shared through a uniform resource locator (URL) associated with the script for various purposes, such as collaboration amongst peers. The user 138 may also share the script with a user (e.g., user 128) associated with the entity P 120 by providing the user 128 with the URL, for example.

It is noted the components shown in this figure and all figures herein are exemplary only, and other implementations may include additional, fewer, integrated, or different components. Some components may not be shown so as not to obscure relevant details.

Figure 2:
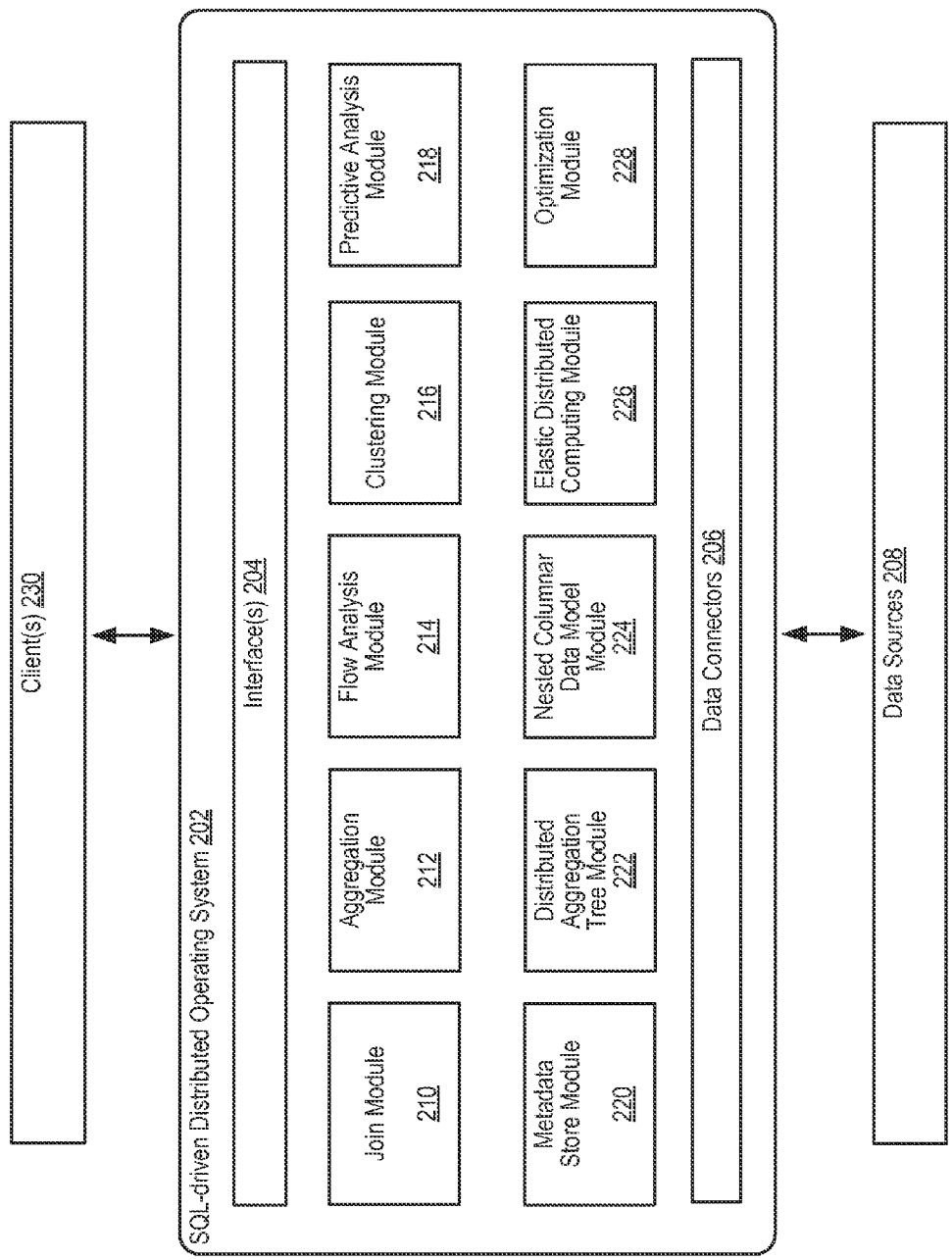
FIG. 2 illustrates an example architecture of an example distributed operating system, according to an embodiment of the present disclosure.

FIG. 2 illustrates an example architecture of an example distributed operating system 202 (e.g., the example distributed operating system 110 of FIG. 1), according to an embodiment of the present disclosure.

The example distributed operating system 202 can include various interfaces 204. Such interfaces can include, for example, client-side data connectors (e.g., ODBC, JDBC, Odata connectors). For example, various clients 230 (e.g., software-based clients) running on computing systems can be utilized to interact with the SQL-driven distributed operating system 202 through the interfaces 204. Such clients 230 can include, for example, an SQL client (e.g., workspace), data visualization clients, integrated desktop environment (IDE) clients, statistical analysis clients, spreadsheet clients, business intelligence tools, etc. The SQL-driven distributed operating system 202 can also include data connectors 206 which can facilitate connections to external data sources including, for example, Lightweight Directory Access Protocol (LDAP) servers that can be used, for example, to authenticate users of the SQL-driven distributed operating system 202. The SQL-driven distributed operating system 202 can also connect data sources and/or data sinks using the data connectors 206.

As mentioned, users can interact with the SQL-driven distributed operating system 202 through one or more clients 230. Through the client(s) 210, users can submit SQL commands to configure, or operate, the SQL-driven distributed operating system 202. As mentioned, these SQL commands can be issued through the interface 204 and the SQL-driven distributed operating system 202 can be configured to provide responses to the SQL commands to the client(s) 210 through the same interface 204. Such responses may include retrieved data, status messages, and/or error messages, for example.

In various embodiments, the SQL-driven distributed operating system 202 can include a metadata store module 220 that can be configured to retain various information including, for example, data sources and data sinks (e.g., database table definitions), other SQL entities defined by users in the course of using the SQL-driven distributed operating system 202 (e.g., views, functions, etc.), scripts (e.g., scripts including SQL statements), security information (e.g., users, user access rights, roles, passwords, etc.), activity logs (e.g., login/logout activity, queries previously executed through the SQL-driven distributed operating system 202, etc.), configuration parameters (e.g., a flag indicating whether experimental features are enabled or disabled), dynamically deduced information about the SQL-driven distributed operating system 202, and any related data (e.g., range of values for a column of a database table; network state, speed, and/or other characteristics; etc.).

The SQL-driven distributed operating system 202 can include a distributed aggregation tree module 222 that can be configured to efficiently aggregate data across multiple compute nodes. For example, when computing the sum of a column across two million rows, stored in two shards of one million rows each, the distributed aggregation tree module 222 can utilize two leaf nodes in the aggregation tree, one per shard, to compute the sum for each shard. A third (root) node, together with parent nodes of the leaf nodes, can be utilized to compute the final sum of the two sums corresponding to the two shards. Sharding is a type of database partitioning that separates very large databases, or tables, the into smaller, faster, more easily managed parts called shards or data shards.

The SQL-driven distributed operating system 202 can include a nested columnar data model module 224 that can be configured to support columns whose type is not a scalar traditionally found in databases, but is, instead, a complete object with multiple fields, which may be scalars, other objects, or arrays thereof. Moreover, the nested columnar data model module 224 may store data in such table columns by storing values across all rows for one field in one block, followed by values across all rows for the second field in a second block, and so on, to generate the nested columnar model. This nested columnar model is in contrast to a row-oriented model where values for all columns and fields in one row are stored in one block, followed by values for all columns and fields in a second row stored in a second block, and so on.

The SQL-driven distributed operating system 202 can include an elastic distributed computing model module 226 that can be configured to execute computation in a distributed fashion based, in part, on a generalization of Distributed Aggregation Trees. The elastic distributed computing model module 226 can be utilized to use more or less compute nodes, as necessary, for the specific computation at hand. For example, a simple addition of two numbers may use a single compute node, while computing the logarithm of every value in a single column of a table with a million rows may engage multiple nodes to process different portions of the table concurrently. This distribution of workloads among compute nodes can be determined based on the computational complexity of the workload and/or the availability of compute nodes (e.g., the number of available compute nodes, the system resources available (e.g., CPU, GPU, memory, etc.) for the compute nodes, etc.).

The SQL-driven distributed operating system 202 can include an optimization module 228 that can be configured to enhance or fine-tune the manner in which queries are executed so that their performance is aligned with the end-user's needs. This can include, for example, simple, traditional techniques (e.g., query rewriting), as well as more complex techniques that accommodate a variety of business needs and context (e.g., ad hoc systems for interactive query issuance and experimentation, batch systems for massive data analysis without interaction, or training sessions where accuracy is secondary to consistency to prevent trainee confusion). The optimization module 228 can use both static information (e.g., the query text and explicitly specified priorities) and dynamic information (e.g., statistics on tables collected from prior queries, network state of data source replicas, etc.) to perform the optimization.

Further, with respect to the optimization module 228, the notion of optimization can extend well beyond traditional query optimization. The optimization of SQL command execution can involve in part the following techniques, as well additional ones (of a deeper technical nature). One example optimization involves traditional query rewriting. For example, the filter $x>20$ AND $x>10$ can be simplified to $x>20$. Another optimization can utilize other traditional techniques, such as caching of frequently used data.

The optimization module 228 can also provide novel extensions of traditional techniques. For example, computer programs expressed in high level languages, such as SQL, are typically executed using one of the following processes to translate the source program into executable native code. One example process involves one-time compilation in which the whole program is translated into a native code representation, and then the latter is executed. Another example process involves interpretation in which an interpreter executes (interprets) one high level instruction, or part thereof, at a time by executing the native code representation of that instruction, and where that native code representation is fixed for each high level language instruction, and embedded within the interpreter. Another example process involves Just-in-Time (JIT) compilation in which an interpreter executes (interprets) one high level instruction, or part thereof, at a time by executing the native code representation of that instruction, unless a sequence of instructions that are executed very regularly is encountered (hotspots), and which the interpreter then translates into native code en mass such that the whole program is translated into a native code representation, and then runs that native code instead of interpreting the individual instructions in that sequence.

In various embodiments, the optimization module 228 uses a variation of JIT. For example, the optimization module 228 can translate every query, however complex it may be, into a single native code representation for the whole query, thus enabling the optimization module 228 to apply many well-known optimization techniques across different parts of the query, such as register allocation, loop unrolling, inlining, and constant folding. In a sequence of queries, the optimization module 228 translates and optimizes one query at a time in a pipelined fashion, e.g., while the first query is executing, the second query is being translated and optimized. The optimization module 228 also uses innovative techniques so that the single native representation resulting from the above translation and optimization is parameterized in a manner that the same representation may be invoked to process different shards of a data source (e.g., each shard may need different parameter values, such as the name of the file containing the shard).

Another optimization involves support for advanced features of standard SQL. For example, if unrelated queries Q1 and Q2 must happen after a row has been inserted into a table T, then using traditional procedural/imperative programming, a user may express that dependency using a hypothetical expression similar to:

If Insert(T) then {Q1; Q2}

That expression, however, doesn't just specify that Q1 and Q2 should happen, it also specifies that Q1 should happen first and Q2 should happen next. This unintentional side-effect is eliminated if the user uses SQL triggers, which, being part of the SQL language, follow its functional/declarative paradigm: the optimization module 228 may then choose to execute Q1 and Q2 concurrently.

In some embodiments, the optimization module 228 extends storage of data accessed by queries in formats that are optimized for efficient retrieval, based on user hints or actual usage patterns. For example, use of column-oriented formats instead of row-oriented formats, or sharding of data across the compute nodes of a multi-compute node installation of the SQL-driven distributed operating system 202.

In some embodiments, the optimization module 228 can utilize user-specified information regarding the data sources and data sinks. For example, based on user-specified information indicating that database R is a replica of a primary database P, the optimization module 228 can obtain the same data from either P or R at the discretion of the optimization module 228.

In some embodiments, the optimization module 228 can utilize dynamically-deduced information regarding data sources and sinks. For example, the optimization module 228 may deduce from past queries that a table's age column contains values which range from 0 to 110 even though the type of that column is an integer capable of representing a much larger range; therefore the shards of this table should not partition the full integer range in equal-sized buckets, but should partition the range 0-110 instead (making an allowance in the edge buckets for negative values and values exceeding 110, should they appear at a later time, possibly by accident).

In some embodiments, the optimization module 228 can utilize dynamically-deduced information regarding the state and performance of various resources associated with the optimization module 228. For example, the optimization module 228 may observe that, at the moment, data source P is inaccessible so all data access for P's data needs to use P's replica R instead; or P and R are both available but R is twice as fast as P, so R should be used for twice as many operations as P.

In some embodiments, the optimization module 228 can utilize business rules. For example, when a query is executed by the CEO, the optimization module 228 may give that query a higher priority than if a query is executed by an intern; or, in a training session where 100 trainees all execute the same query per the instructor's advice nearly concurrently, the optimization module 228 may execute the query once and return the same result to all participants.

In some embodiments, the optimization module 228 can utilize analysis of past usage patterns. For example, if a data source is most heavily used during the times of day that two of US, Europe, and Asia are in business hours, then the optimization module 228 may delay certain operations (those that the user stated may be delayed until a later time) until a single region is in business.

In some embodiments, the optimization module 228 can utilize knowledge (with reasonable certainty) of future scheduled events. For example, the optimization module 228 may deduce that a query Q against data source P executed now, at 2:55 am, is expected to run for approximately 10 minutes given current load on P, and, if executed on P's replica R instead, it will run for approximately 15 minutes given current load on R. However, the optimization module 228 may also determine that current load is not always an accurate predictor: Q, if executed now on P, will likely run for an estimated 25 minutes, not 10, because the optimization module 228 is aware of a separate, nightly 3:00 am query that is scheduled to start 5 minutes from now, and will overload P; so, instead, the optimization module 228 may choose to run Q on R, instead.

In some embodiments, the optimization module 228 can provide an allowance for absolute or probabilistic error margins. For example, consider a query for the average height of 1,000 subjects, of which 100 are stored on a currently slow or inaccessible data source. The optimization module 228 may ignore those 100 subjects, and return quickly the average height of the remaining 900, if the specified allowed error margin in the execution of the query is 10% and either (i) (absolute margin) prior access to the data for those 100 subjects has enabled the optimization module 228 to cache the knowledge that their minimum and maximum heights are within 1 inch of the average of the remaining 900 subjects or (ii) (probabilistic margin) the 100 subjects are only 10% of the total population and therefore, if they are a random subset, they are unlikely to sway the average height.

The SQL-driven distributed operating system 202 can include a join module 210 that can be configured to efficiently perform SQL joins, for example, of database tables from the same data source (e.g., relational databases) or from multiple, disparate sources (e.g., relational databases and NoSQL-based databases). An SQL join can be used to combine records from two or more tables in a database, for example, by combining fields from the tables using values common to each to create a set that can be saved as a new, separate table or used as it is. For example, the join module 210 can handle a join of a small database table and a large database table by loading the small database table in the cache or Random Access Memory (RAM) of one or more compute nodes that are involved in the join and by sharding the large table across multiple, or all, compute nodes.

The SQL-driven distributed operating system 202 can include an aggregation module 212 that can be configured to efficiently perform a variety of SQL aggregations, for example, using Distributed Aggregation Trees and other performance enhancement techniques. These aggregations can include standard SQL aggregation functions, as well as user-defined functions (UDFs).

The SQL-driven distributed operating system 202 can include a flow analysis module 214 that can be configured to perform the computations that may be needed to drive visualizations, for example, through a data visualization client 230. The flow analysis module 214 can also be configured to analyze other flows such as customer flows, which can include paths customers take to purchase, churn, and other insights into customer behaviors. Analysis across such customer interactions can lead to increased customer acquisition, loyalty, and product adoption. In another example, the flow analysis module 214 can also be configured to analyze device behavior flows, which can include paths leading to suboptimal device performance, or even overloading and failure. Such analysis can be used for reducing downtime and ensuring business continuity, for example. The flow analysis module 214 can also detect changes in flow to indicate possible security breaches. For example, using flow analytics it would be possible to detect increased traffic from an internal server by an external hacker.

The SQL-driven distributed operating system 202 can include a clustering module 216 and a predictive analysis module 218 that can be configured to perform user-level analytics operations, for example, by using one or more of the other modules of the distributed operation system 202 as building blocks. In some instances, predictive analysis can include algorithms that are expressed in SQL and rely on machine learning techniques, such as neural networks and genetic programming. For example, using building blocks such as triggers and parametrized pipelines, general-purpose state machines can be implemented with the distributed operating system 202. Building state machines expressed in SQL can be used to perform machine learning that require iterative analysis (i.e.: loops).

As mentioned, the SQL-driven distributed operating system 202 can be utilized to submit SQL commands, for example, through an interface 204 (e.g., workspace interface). SQL is standardized by both the American National Standards Institute (ANSI) and the International Organization for Standardization (ISO). The SQL-driven distributed operating system 202 can be configured to understand and act upon standard SQL. Additionally, in various embodiments, the SQL-driven distributed operating system 202 can extend the standard SQL in a number of ways. For example, the SQL-driven distributed operating system 202 can extend arrays (repeated fields) and associated, high-performance operations on them. Generally, most table columns in SQL are of scalar quantities, e.g. strings or text, numbers, dates, timestamps, to represent homogeneous collections of objects. In standard SQL, one usually creates a table where each collection element is stored in a separate row. In various embodiments, when utilizing the SQL-driven distributed operating system 202, a column value may be an array (a repeated field). Moreover, that array may contain so-called NULL elements, i.e. elements with an undefined value. Also, the SQL-driven distributed operating system 202 can define SQL functions that extend the set of SQL built-in functions and operate on arrays. These functions are designed to achieve high-performance. For example, arrays that represent small sets may be stored as integer bitmasks in which case array comparison is performed using a single-step comparison of their bitmasks.

In another example, the SQL-driven distributed operating system 202 can extend composite data (nested fields) and associated, high-performance operations on them. Typically, in order to store complex objects in SQL tables, one usually creates a table whose columns are the fields of the complex object class; then, each row represents a single object instance. For example, the object class Point(Integer x, Integer y) is stored as a table with integer columns x and y; the instance Point(1, 2) is stored as the table row (1, 2). In various embodiments, when utilizing the SQL-driven distributed operating system 202, a column type may be an object class, and its value may be an object instance. Moreover, instances may be NULL, i.e. an undefined instance of the object class. Also, the SQL-driven distributed operating system 202 can define SQL functions that extend the set of SQL built-in functions and operate on such columns (nested fields). These functions are designed to achieve high-performance. For example, the SQL-driven distributed operating system 202 may store a hash value alongside each object instance, and thus determine that two objects are unequal during a SQL equi-join using a single-step hash value comparison instead of comparing all component fields of the two objects one-by-one.

In some embodiments, the SQL-driven distributed operating system 202 can extend nested/repeated or repeated/nested fields and associated, high-performance operations on them. The above repeated and nested fields, as well as standard scalar quantities may be intermixed in arbitrary ways. For example, the type of a table column may be an array of objects, with each object containing a field which is itself an array of integers.

In some embodiments, the SQL-driven distributed operating system 202 can extend user-defined functions (UDFs). Typically, standard SQL defines a number of built-in functions, many of which the SQL-driven distributed operating system 202 implements, to perform analysis. For example, SQL defines the AVG(c) function, which computes the arithmetic mean across all or a subset of values (presumed numeric) within column c of some table. The SQL-driven distributed operating system 202 can allow for a user to extend the set of supported functions via functions composed by the user in any language. Some example languages include Lua, Jython, and Java, but the integration of additional languages is an easy matter for anyone skilled in the art. Moreover, the manner in which the user defines new functions is by issuing commands, through the SQL-driven distributed operating system 202, that are SQL-like in design, but not part of the SQL standard. Thus, for example, the user may issue this SQL command to define a function extract(c) which receives a text string and returns the portion of it that is enclosed by square brackets:

```
CREATE FUNCTION extract(data VARCHAR)
  RETURNS VARCHAR LANGUAGE JYTHON AS $$
  def extract(data):
    i0 = data.find("[")
    i1 = data.find("]")
    return data[i0 + 1:i1]
  $$;
```

In some instances, UDFs, as described above, operate on scalar quantities and return scalar quantities. The SQL-driven distributed operating system 202 also supports UDFs which return complete tables. These Table-Valued Functions (TVFs) make it possible, for example, for a UDF (and TVF, in that case) to read a spreadsheet file, for example, from a data store, and return its contents as a table whose rows and columns reflect the original file's organizational structure. UDFs, as described above, are insular: they operate against their parameters using operations natively available within the chosen language, and return a result, be it a scalar or a table. However, the SQL-driven distributed operating system 202 (unless configured otherwise for security reasons) also allows UDFs to invoke external services as well. For example, a UDF implemented through the SQL-driven distributed operating system 202 may receive as parameters (i) the name of an existing image file in Joint Photographic Experts Group (JPEG) format and (ii) the name of a non-existent image file in Portable Network Graphics (PNG) format. In this example, the UDF may invoke an executable that reads the former file, converts its format from JPEG to PNG, and writes out the latter file. The UDF returns the undefined value NULL, if the operation succeeded; otherwise, it returns a string containing the error encountered. In another example, a UDF implemented through the SQL-driven distributed operating system 202 may receive as its single parameter a matrix, invoke a native executable that is capable of performing matrix inversion using custom, high performance hardware, feed the parameter matrix into the executable via its standard input stream, read the inverted matrix via the executable's standard output stream, and return that result. In another example, a UDF implemented through the SQL-driven distributed operating system 202 may receive as parameter a United States address that lacks a zip code, forward that address to a public web service provided by the United States Postal Service to locate the proper zip code (this can be done via an HTTP request similar to a browser navigating to the usps.com zip code lookup page), receive the zip code, and return that result.

In this manner, the set of possible computations which the SQL-driven distributed operating system 202 may perform is unbounded: any computation that can be expressed in any computer language (not just those supported as composition languages for UDFs implemented through the SQL-driven distributed operating system 202), even ones that execute partly on a different set of computing resources, can be invoked by queries submitted through the SQL-driven distributed operating system 202, for example.

Additionally, standard SQL does not provide a mechanism for a user to create a parametrized, named sequence of SQL commands, which is a sequence of commands where, for example, the name of a table used in these commands is supplied as a parameter. The SQL-driven distributed operating system 202 can provides this facility or "pipelines". A pipeline is akin to what one skilled in the art may consider a procedure, and may be invoked using another command by which the SQL-driven distributed operating system 202 has extended standard SQL. The SQL-driven distributed operating system 202 also includes extensions to other parts of the SQL standard for the benefit of the above extensions. Anyone skilled in the art may deduce the adjunct extensions mandated by the ones listed above. For example, the standard SQL information schema can only describe the standard SQL data types. In contrast, the SQL-driven distributed operating system 202 can extend the SQL information schema to address nested and repeated fields.

In addition to extending SQL, the SQL-driven distributed operating system 202 can also extend the state of the art in data analytics in a number of dimensions. The SQL extensions described above necessitate additional extensions to other functional components of the SQL-driven distributed operating system 202. For example, the SQL-driven distributed operating system 202 can extend existing file formats so that they may store tables containing nested and repeated fields. In one example, consider a table with two rows, each with two columns, the first column being the name of a point of text type, and the second column being its 2D coordinates of a custom nested type {x,y}, where x and y are both integers. The two rows are:

a, {x:1, y:2}
b, {x:3, y:4}

In this example, the extension of file formats provided by the SQL-driven distributed operating system 202 allows for regular, row-oriented storage of the above table in a file with contents "a 1 2 b 3 4". The extension of file formats provided by the SQL-driven distributed operating system 202 also allows for top-level-only column-oriented storage of the above table in a file with contents "a b 1 2 3 4". In this format, a query that filters out rows based on the value of the first column may read only the first third of the file to decide which subset of rows meet the filtering criteria. The extension of file formats provided by the SQL-driven distributed operating system 202 can also allow for column-oriented storage of the above table at all levels (even grouping all x values together ahead of the y values) in a file with contents "a b 1 3 2 4". This format helps further with queries that filter rows based on the value of an nested field.

With respect to the SQL-driven distributed operating system 202, what constitutes a data source or sink is broader than is typically the case in most software systems that manage or operate on data. For example, the SQL-driven distributed operating system 202 makes use of existing inter-connectivity interfaces (e.g., ODBC) so that users may couple the SQL-driven distributed operating system 202 with existing compatible software components (e.g., ODBC drivers) to enable the SQL-driven distributed operating system 202 access to data sources and sinks supporting such interfaces. Moreover, through the use of TVFs, users may transform arbitrary data sources into tables managed by the SQL-driven distributed operating system 202. Furthermore, the data source and/or data sink APIs provided by the SQL-driven distributed operating system 202 may be extended to provide access to arbitrary sources (e.g., live connections to cameras, microphones, temperature, or GPS sensors) or sinks (e.g., switches, actuators, or motors).

Further, with respect to the SQL-driven distributed operating system 202, what constitutes a computation is broader than is typically the case in most software systems. Despite using SQL, the SQL-driven distributed operating system 202 is not limited to the operators mandated by the SQL standard. For example, operators utilized through the SQL-driven distributed operating system 202 may be used to effect analysis and manipulation of image and other media.

UDFs, pipelines, the scripts, data source/sink extensions, and other mechanisms are all ways in which the SQL-driven distributed operating system 202 may be extended by users. The SQL-driven distributed operating system 202 can include a variety of such mechanisms, some intended for training purposes, and others intended for use in production deployments as building blocks of higher-level operations. For example, the SQL-driven distributed operating system 202 can include UDFs to re-compress an image from JPEG to PNG format; pipelines and scripts for clustering, descriptive, and predictive analytics; and TVFs to turn an Excel file into a table and vice versa.

In some embodiments, the SQL-driven distributed operating system 202 can provide auditing of its activity. That activity may be analyzed using an interactive data flow visualization tool, as well as through the SQL-driven distributed operating system 202 itself, and thus subjected to arbitrary complex analyses, such as document similarity searches for e-discovery and proof-of-compliance for deletion policies.

In various embodiments, the SQL-driven distributed operating system 202 can be installed on various computing platforms including, for example, computing devices, computing systems, cloud computing systems, to name some examples. An administrator, or user, of the SQL-driven distributed operating system 202 can allow the SQL-driven distributed operating system to operate at various times throughout the day (e.g., overnight) to perform various operations (e.g., computations). Such operations may be performed with respect to any security constraints, for example, regarding data encryption and/or data movement.

In various embodiments, the SQL-driven distributed operating system 202 can support resource sharing techniques. For example, the SQL-driven distributed operating system 202 can be running on a computing system of a second user and can be configured to charge a first user that initiates an operation that is performed by the computing system of the second user. Similarly, storage space can also be made available through the computer system of the second user and the SQL-driven distributed operating system 202 may use the storage space for storing temporary data which may be subject to any security constraints, for example, regarding data encryption and/or data movement. In various embodiments, the second user may be compensated based on the usage of the storage space.

Such resource sharing techniques may also be employed equally well in server settings. For example, the SQL-driven distributed operating system 202 may be used to optimally allocate resources (e.g., computing resources, storage resources, etc.) across servers in a computing datacenter. In another example, a United States company that has a fixed amount of computing resources but uses them very little at night may make its resources available to other companies that are located in Europe, thereby allowing such companies to take advantage of the computing resources during their business hours. In another example, a distributed operating system 202 that is implemented as a cloud computing-based service may rent out and guarantee a fixed amount of computing resources to a customer while still reserving the right to use unused portions of those resources for other internal purposes, or for other customers, provided such use is terminated as soon as the customer wishes to re-engage these resources for her own purposes.

The SQL-driven distributed operating system 202 need not operate on large computer systems, be they server or desktop computers. For example, a light footprint version of distributed operating system 202 may operate on portable devices including, for example, cell phones and/or tablet computing devices. Such an approach allows for the SQL-driven distributed operating system 202 to act as the underlying mechanism to transfer information between a computing system of a user, a cloud-based account of the user (e.g., for hosted email, social networking, etc.), and a mobile device (e.g., cell phone) of the user. In other words, to not think of such components as being distinct from one another, the approaches described herein allow for such components to be treated as invisible components of a unified system which, collectively, offers high computation power and storage (for example, by leveraging the cloud computing system), high portability (for example, by leveraging the mobile device), and fast access to medium sized data and medium computation (for example, by leveraging the computing system and its communications link (e.g., Wi-Fi, Bluetooth, etc.) to the mobile device, and its high-speed connection to the cloud computing system). In such a consumer-oriented business model, the SQL-driven distributed operating system 202 may provide local connectivity, as described, as well as global connectivity, interconnecting local users. In either case, consumer business models applicable to network service providers, be they wireless data (e.g., Wi-Fi) providers or Internet service providers, can become possible in the data management domain, which is traditionally subject to enterprise business models.

In various embodiments, a light footprint version of the SQL-driven distributed operating system 202 that can operate on commodity, consumer hardware, embedded computing systems, or special-purpose computing systems such as cell phones or tablets, as well as TV set-top boxes and gaming consoles, may turn such simple devices into compute nodes of a larger, server-class distributed system composed of elementary non-server-class components. This approach is similar in principle to the manner in which Redundant Arrays of Independent Disks (RAID) systems use multiple low-end disks as components to build server-class storage systems. For example, consumer cell phones in Europe, while they recharge at night, may be used for daytime business operations in the United States. Similarly, home gaming consoles, which possess powerful graphics processing hardware capable of massive, yet niche, computations at high-speed, may be used during business hours by businesses. In this manner, the SQL-driven distributed operating system 202 can extend the business models mentioned above to a global scale, involving participants with a wide range of equipment.

The light footprint version of the SQL-driven distributed operating system 202 may operate on any computer-enabled device, such as vehicles, electricity meters, or voltmeters. Thus, a car manufacturer may use the SQL-driven distributed operating system 202 to monitor vehicle location for anti-theft purposes, to monitor engine performance to recommend repairs or maintenance, or to issue recall notifications via the on-board computer. In another example, a utility company may use the SQL-driven distributed operating system 202 to measure electricity consumption for billing purposes or to enable junior field technicians to communicate their measurement with senior main office technicians who can assist with troubleshooting.

In these example scenarios, data movement can be augmented with computation and analysis, possibly against additional data sources. For example, if the gas consumption of a vehicle does not match terrain information at the vehicle's location—which can involve an analytical computation requiring access to global map information and aggregate statistics on engine performance—this may suggest an engine problem. Electricity consumption may also be compared to normal patterns and possibly correlated to temperature information, for example. The analysis described with respect to the example scenarios may lead to actions that can also be taken via the SQL-driven distributed operating system 202. For example, in the event of vehicle theft, the SQL-driven distributed operating system 202 may turn off the engine of a stolen vehicle. In another example, in the event of a flood, the SQL-driven distributed operating system 202 may turn off electricity supply to flooded areas to minimize the risk of electrocution. In the example scenarios described above, the SQL-driven distributed operating system 202 can facilitate the development of applications to which the SQL-driven distributed operating system 202 serves as the underlying platform. Business models applicable to general software platforms may thus become viable in setting where, thus far, software has been a minor participant rather than a core technology.

Another historical pattern that has emerged in computing is the gradual speed-up in the cycle of experimentation. This cycle consists of composing a program (or a model), running the program (or a simulation), evaluating the results, altering the program, and re-running it, and so on. This cycle of iterative improvement is natural to scientific exploration in general, but, in computing, the duration of this cycle has been drastically reduced over the years. In the early days, the slowest part of the above-described cycle was running the program, leading to extensive human operator downtime. Nowadays, for most computer tasks, the human operator has little downtime and productivity has risen dramatically because computers have grown faster. Moreover, computer languages and tools have developed that make it much easier to express a desired computation naturally, or by leveraging existing technologies and paradigms: not every human operator has to reinvent the same wheel. However, for many tasks involving complex computation or massive amounts of data, the execution time dominates and, for large-scale distributed computing and storage, the infrastructure is still immature and complex for human operators to handle.

In various embodiments, the SQL-driven distributed operating system 202 can be configured to address both of the above-mentioned dimensions. For example, as noted earlier, the SQL-driven distributed operating system 202 is a high-performance system that optimizes across numerous dimensions. Further, the user experience is at a high-level of abstraction and quite a bit removed from the underlying mechanics, which the SQL-driven distributed operating system 202 manages transparently on behalf of most users (administrators of the SQL-driven distributed operating system 202 being excluded). In one example, the SQL-driven distributed operating system 202 is able to achieve both goals through a mixed use of SQL, Jython, Java, other UDF composition languages, and native tools. For example, SQL is a well-known functional/declarative language, and thus expresses the desired computation in a manner that is colloquially described as "tell me what outcome you want". This is generally a simple task for the user, which provides the SQL-driven distributed operating system 202 a lot of latitude in choosing the steps that lead to the desired outcome so that those steps will execute in the shortest time possible. SQL, as implemented by the SQL-driven distributed operating system 202, can include support for advanced SQL features, such as triggers and common table expressions, so that the user may compose complex control flows (e.g. conditional execution or tail recursion) wholly within SQL and thus leverage its declarative nature and the ability of the SQL-driven distributed operating system 202 to optimize execution of these flows. Jython is also a well-known language, but a procedural/imperative one, which can express a computation as "tell me what steps I should take so that the outcome of those steps will match your intent". This is a far more natural language for classically trained computer scientists to express their algorithms. Moreover, Jython can use Java packages seamlessly, which means that the user may leverage a large amount of pre-existing software as building blocks to solve larger problems. Native tools typically cannot be optimized, but they provide ready-made solutions to subproblems, and can thus be readily used as building blocks.

Returning to the original point, the SQL-driven distributed operating system 202 enables productivity gains via higher performance and ease of expressing new algorithms, which in turns shortens the duration of the cycle of experimentation, leading to faster innovation. This makes it possible for the SQL-driven distributed operating system 202 to adopt business models that quantify not only the use of the SQL-driven distributed operating system 202 (e.g., number of queries executed), but also the increase in productivity (e.g., time saved in completing an experimental cycle). Additionally, the SQL-driven distributed operating system 202 possesses two key abilities that enable the SQL-driven distributed operating system 202 to be deployed as a side-by-side solution to existing systems. For example, the SQL-driven distributed operating system 202 may act on data in situ, without first migrating the data into storage owned and managed by the SQL-driven distributed operating system 202. Moreover, the SQL-driven distributed operating system 202 is able to run on both bare-metal systems (where the hardware is controlled by the operating system and the SQL-driven distributed operating system 202 is installed as a software application within that operating system) as well as on virtualized systems (where, typically, the hardware is controlled by a host operating system, on which a virtual machine application creates the perception of an independent virtual hardware with its own, distinct guest operating system, and the SQL-driven distributed operating system 202 is installed as a software application within the guest operating system). The latter mechanism means that virtual, not physical, hardware is sufficient for the SQL-driven distributed operating system 202 to become available within an enterprise or even on a personal computer.

The above-described features and approaches can enable business models that allow for gradual adoption of the SQL-driven distributed operating system 202 with little commitment, or a large upfront expenditure in capital, or staffing, or time spent in data migration; for example, a rental model. Moreover, the ability of the SQL-driven distributed operating system 202 to perform massive computation on a cloud despite a small on-premises footprint (to gain access to on-premises data sources) enables use of elastic costing models (pay-as-you-go and pay-for-what-you-use).

Figure 3A:
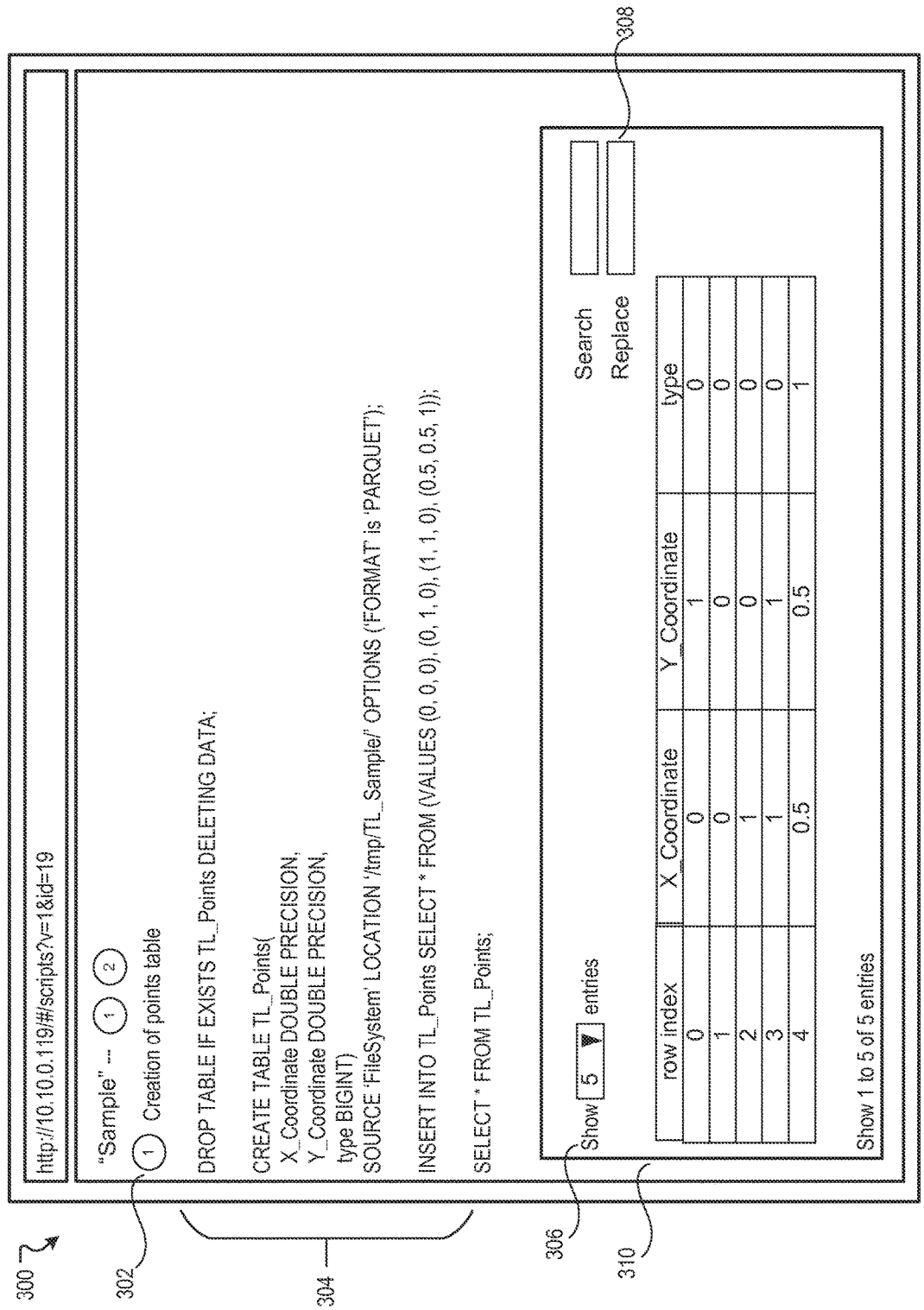
FIGS. 3A-B illustrate example workspace interfaces for interacting with the SQL-driven distributed operating system, according to an embodiment of the present disclosure.
Figure 3B:
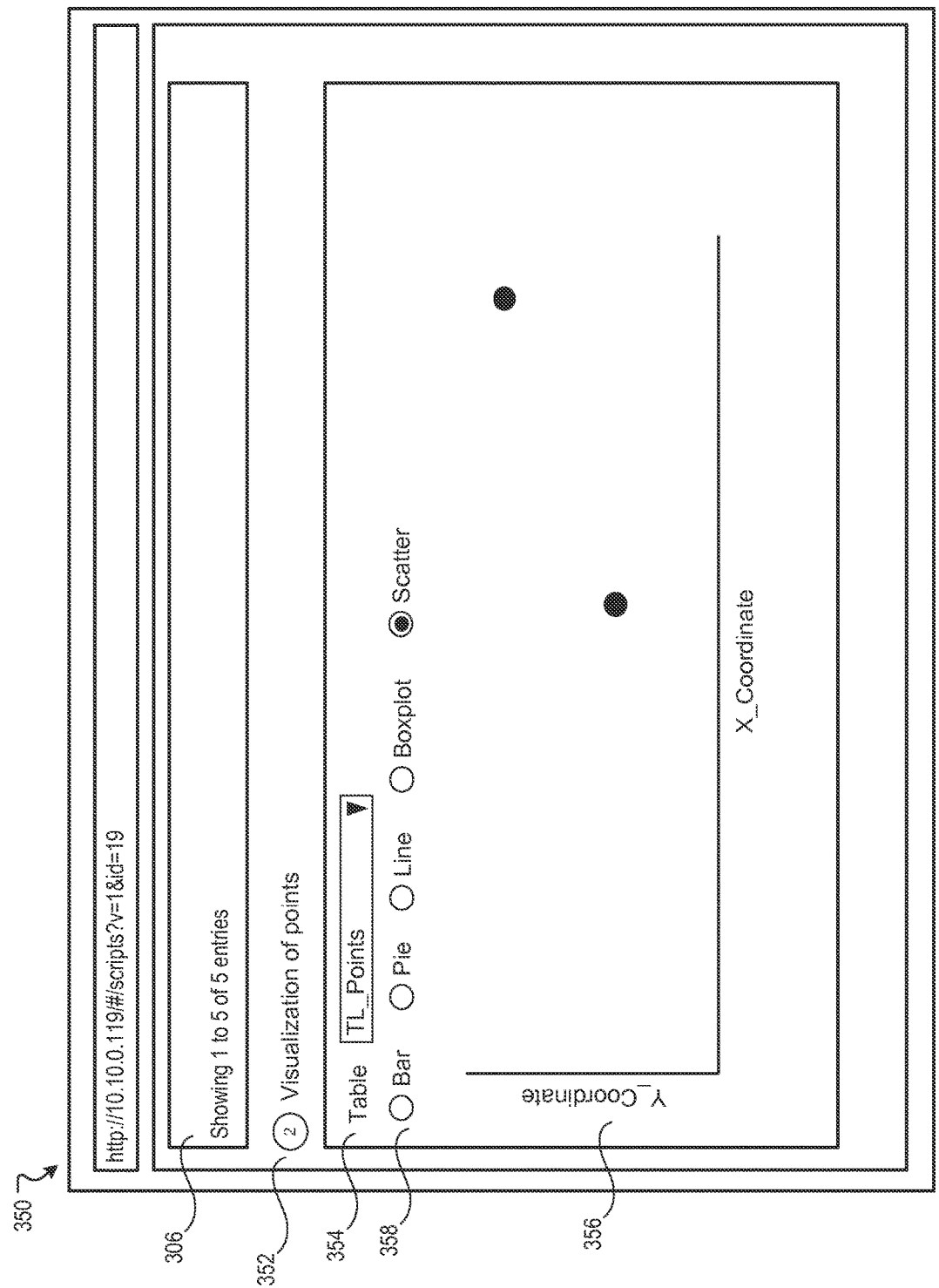

FIG. 3A and FIG. 3B illustrate example workspace interfaces 300, 350 for interacting with the SQL-driven distributed operating system, according to an embodiment of the present disclosure. As mentioned, the SQL-driven distributed operating system (e.g., the SQL-driven distributed operating system 110 of FIG. 1) can provide an interactive workspace 300, 350 for the composition and execution of queries. This workspace 300, 350 can provides features that include one or more, or portions of, elements of command-line terminals, traditional editors, IDEs, visualization systems, and other tools.

The workspace 300, 350 can be presented through a software application (e.g., as a web page accessed through a web browser) running on a computing device, for example. The workspace 300, 350 can include a sequence of vertically arranged and numbered cells 302, 352. The workspace 300, 350 can be a single, named script (e.g., "Sample"), while the cells 302, 352 may be individually named (e.g., "Creation of points table", "Visualization of points") or remain anonymous.

A cell 302 can be used to input SQL commands 304, which can be syntax highlighted. Further, context-sensitive auto-complete and other advanced editing features may be used (e.g. in a FROM clause, a list of known tables may be presented so that the user may choose one among them, instead of typing a table name, for example). Cells 302 may also contain UDFs, with appropriate syntax highlighting for the UDF's composition language. In some embodiments, cells 352 may also contain custom visualizations or other content, as illustrated in FIG. 3B.

A cell 302 can also provide high-level user interfaces to access and connect to data from different data sources. The user can select the type of data source, which includes remote databases, cloud services, cluster file systems, and local storage. The system can introspect these data sources to help the user discover available data (based on the user's foreign credentials to the data source). For example, with an RDBMS data source, the system will discover both databases (catalogs) and tables accessible by the user. The cell 302 can enable a user to preview the data contents from a data source and to connect to a number of tables, collections, and/or files at once, as example functionality.

In addition to advanced editing features, the workspace 300, 350 can provide interactive dialog box sequences (e.g., wizards) that assist the user in composing a cell's 302 contents. For example, to compose an "SQL CREATE TABLE" statement bound to a spreadsheet file, a wizard allows the user to open the file, preview its contents, select desired sheets, columns, and rows, and specify the names and types of the table to be derived from that spreadsheet. At the conclusion of this wizard, the interactively composed CREATE TABLE statement can be deposited inside a cell containing SQL commands, for optional manual adjustments and subsequent execution.

In some embodiments, cell 302, 352 types can be executable. For example, a cell can be executable such that the contents (e.g., commands 304) of the cell 302 can be interpreted as commands (e.g., general SQL commands, or commands effecting a single UDF definition). In the example of FIG. 3A, the commands 304 inputted into the cell 302 can be used to generate a table 306. The cell 302 can provide various features for modifying and/or interacting with the table 306. For example, the table 306 can include a drop-down menu 310 for adjusting the number of entries that are shown in the table 306. In another example, the table 306 can include a search-and-replace 308 feature to search for entries and optionally replace them in the table 306. The cell 302 also provides execution statistics, such as the execution time and number of rows returned. The cell 302 can also display query execution and optimization information in graph form.

In some embodiments, a cell can be executable such that the contents of the cell can be dynamically determined. For example, as illustrated in the example of FIG. 3B, a visualization cell 352 for which the visualization 356 (e.g., graph, chart, diagram, etc.) can be derived from the contents of the table 306, for example. Executing the cell 352 can update the visualization 356 to reflect the current table contents. As illustrated in FIG. 3B, the visualization 356 can include a drop-down menu 354 for selecting a table to be visualized. The visualization 356 can also include options 358 for modifying the type (e.g., bar chart, pie chart, line graph, boxplot, scatter plot, etc.) of visualization 356 that is presented.

In some embodiments, if an execution fails, an error message can be shown, for example, in the lower section of the cell. If appropriate, the corresponding portion of the cell's text can be marked as being responsible for the error (e.g., in the case of syntax errors). The workspace 300, 350 can show the full query chain and highlight the offending part of each query in the chain. In some instances, the workspace 300, 350 can limit the amount of data that may be returned from the back-end to the workspace 300, 350 during query execution to prevent the unintentional execution of long-running, errant queries that overwhelm the capabilities of the user's browser.

Cells which, upon execution, produce a table can contain, for example, in their lower section, either a tabular representation of the table (e.g., a table with 2D coordinates and/or classification/type for each point) and/or a visualization driven by the table values (e.g., a scatter plot of the same 2D points, using color to distinguish point classes). The user may switch between available representations and visualizations. In this example, the tabular representation is used in the "Creation of points" table cell 302. In some embodiments, the associated scatter plot visualization for the table 302 would look similar or identical to the "Visualization of points" cell 352.

In some embodiments, a script may be executed as a whole, in which case the SQL-driven distributed operating system can provide interactive progress feedback as each cell is executed in sequence, for example, by highlighting the cell number in a scrolling list of cell numbers. The interactive progress can show real-time usage statistics of the SQL-driven distributed operating system for queries in a given cell, workspace, or all workspaces currently executing queries. Cells can be re-ordered within the user interface to alter the sequence. Cells can be excluded from the sequence.

Debugging features such as breakpoints and watches can enable a cell to puase the sequence execution. Execution can also be controlled by the user through step into and step out of debugging functionality. Scripts may also be saved in or retrieved from a data (e.g., metadata) store associated with the SQL-driven distributed operating system, and imported from/exported to the user's computer device where the interface 300, 350 (e.g., browser) is executing.

In some embodiments, scripts can be subject to a security model, so that they may be private to a single user, public and available to all users, or have intermediate forms of limited visibility. Scripts may be shared by simply sharing the script's URL or name. Shared scripts may be concurrently executed, for example, by different users on different computing systems. In terms of concurrent editing, it may be either allowed or disallowed, depending on the implementation and/or configuration. If concurrent editing is allowed, then changes made by one user can be near-instantaneously propagated to other collaborating users using collaboration techniques well-known in the art. If concurrent editing is disallowed, then the SQL-driven distributed operating system can detect concurrent changes, should they occur, by storing an always-increasing version number alongside each script alteration and allowing only the user possessing the latest version of the script to save a newer version, for example.

Figure 4:
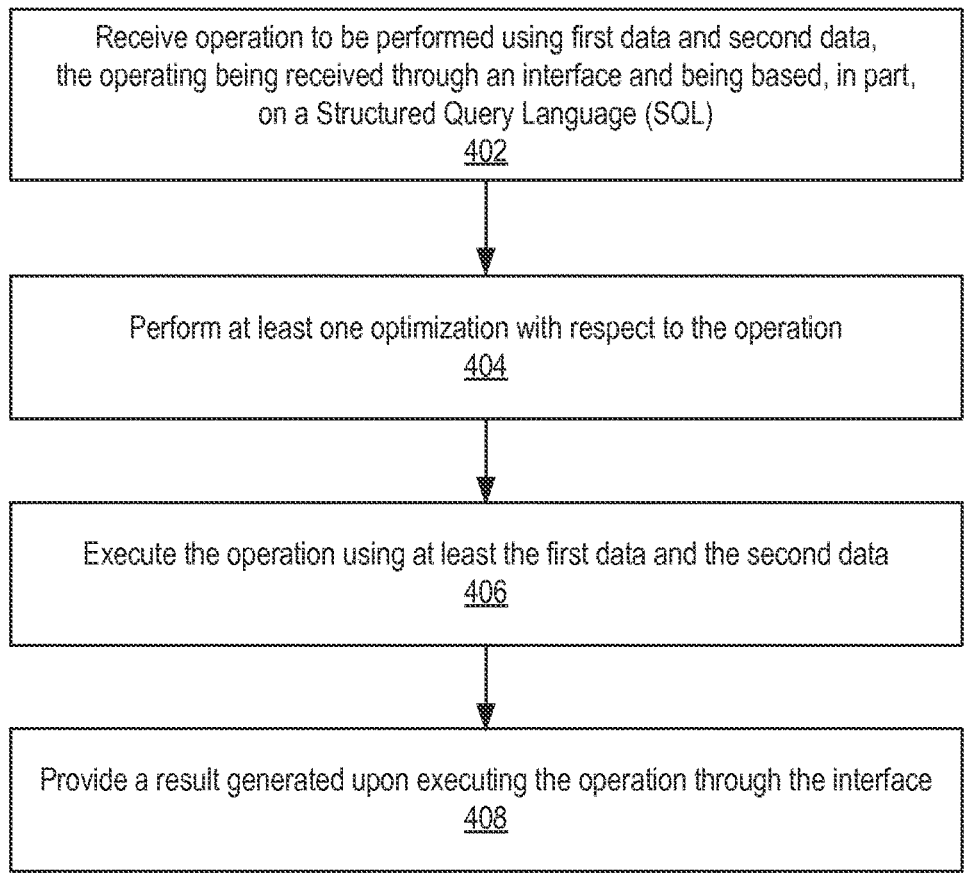
FIG. 4 illustrates an example method for performing operations using the distributed operating system, according to an embodiment of the present disclosure.

FIG. 4 illustrates an example method 400 for performing operations using the distributed operating system, according to an embodiment of the present disclosure. It should be appreciated that there can be additional, fewer, or alternative steps performed in similar or alternative orders, or in parallel, within the scope of the various embodiments unless otherwise stated.

At block 402, at least one operation to be performed using (i) first data that is managed by a first computing system and (ii) second data that is managed by a second computing system is received. The operation can be received through an interface provided by the computing system. Further, the operation can be based at least in part on a Structured Query Language (SQL). At block 404, at least one optimization can be performed based at least in part on the operation. At block 406, the operation can be executed using at least the first data and the second data. At block 408, a result generated can be provided upon executing the operation through the interface provided by the computing system. The computing system, the first computing system, and the second computing system can each concurrently process, access, and create at least a portion of the generated result.

Hardware Implementation

Figure 5:
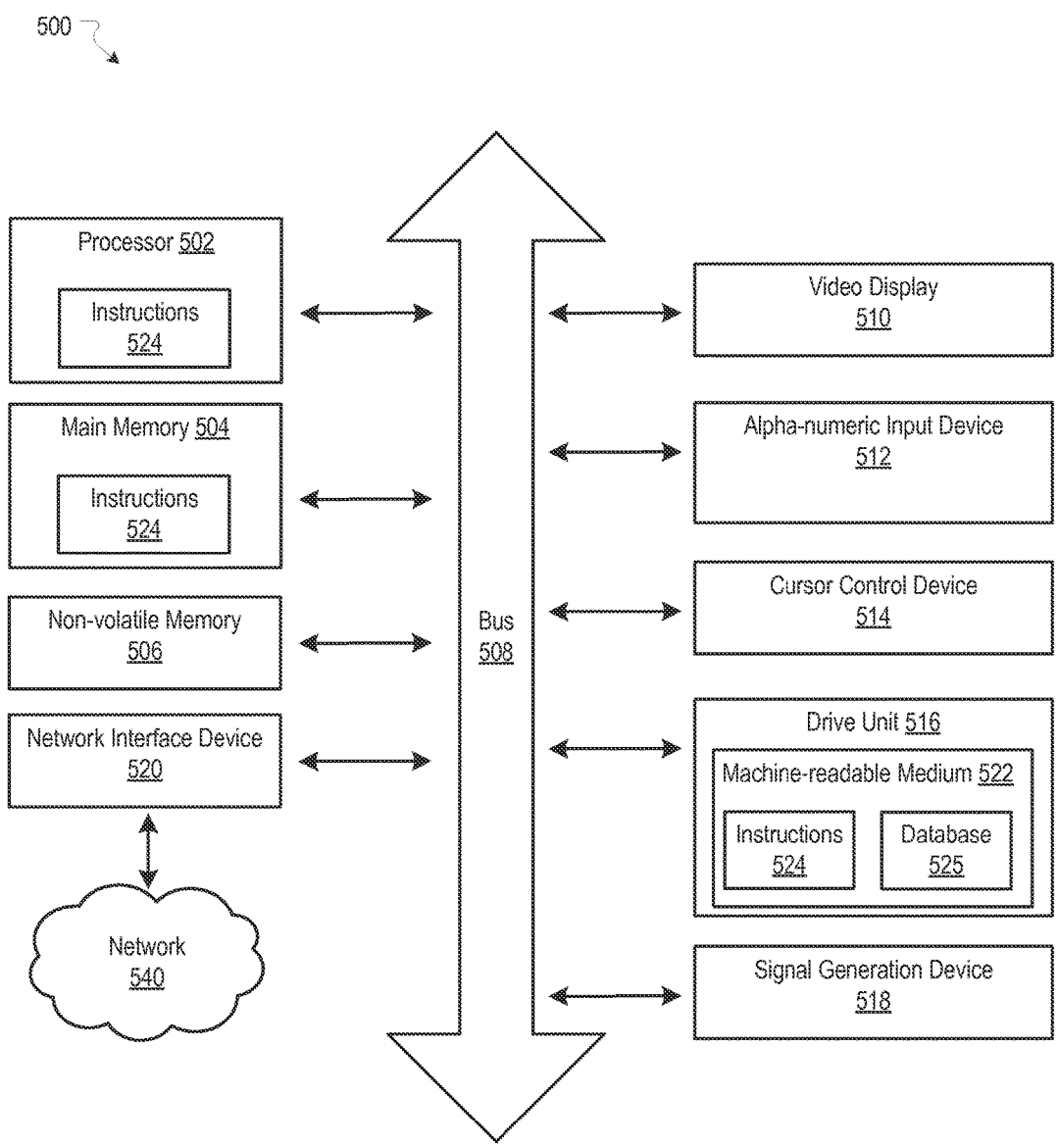
FIG. 5 is a diagrammatic representation of an embodiment of the machine, within which a set of instructions for causing the machine to perform one or more of the embodiments described herein can be executed, according to an embodiment of the present disclosure.

FIG. 5 is a diagrammatic representation of an embodiment of the machine 500, within which a set of instructions for causing the machine to perform one or more of the embodiments described herein can be executed. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with the server to facilitate operations of the server and/or to access the operations of the server.

The machine 500 includes a processor 502 (e.g., a central processing unit (CPU), a graphics processing unit (GPU), or both), a main memory 504, and a nonvolatile memory 506 (e.g., volatile RAM and non-volatile RAM), which communicate with each other via a bus 508. In some embodiments, the machine 500 can be a desktop computer, a laptop computer, personal digital assistant (PDA), or mobile phone, for example. In one embodiment, the machine 500 also includes a video display 510, an alphanumeric input device 512 (e.g., a keyboard), a cursor control device 514 (e.g., a mouse), a drive unit 516, a signal generation device 518 (e.g., a speaker) and a network interface device 520.

In one embodiment, the video display 510 includes a touch sensitive screen for user input. In one embodiment, the touch sensitive screen is used instead of a keyboard and mouse. The disk drive unit 516 includes a machine-readable medium 522 on which is stored one or more sets of instructions 524 (e.g., software) embodying any one or more of the methodologies or functions described herein. The instructions 524 can also reside, completely or at least partially, within the main memory 504 and/or within the processor 502 during execution thereof by the computer system 500. The instructions 524 can further be transmitted or received over a network 540 via the network interface device 520. In some embodiments, the machine-readable medium 522 also includes a database 525.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to any of the computer systems described herein through a network interface such as a modem or Ethernet interface, can also be used.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals. The term "storage module" as used herein may be implemented using a machine-readable medium.

In general, routines executed to implement the embodiments of the invention can be implemented as part of an operating system or a specific application, component, program, object, module or sequence of instructions referred to as "programs" or "applications". For example, one or more programs or applications can be used to execute any or all of the functionality, techniques, and processes described herein. The programs or applications typically comprise one or more instructions set at various times in various memory and storage devices in the machine and that, when read and executed by one or more processors, cause the machine to perform operations to execute elements involving the various aspects of the embodiments described herein.

The executable routines and data may be stored in various places, including, for example, ROM, volatile RAM, non-volatile memory, and/or cache. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of machines, those skilled in the art will appreciate that the various embodiments are capable of being distributed as a program product in a variety of forms, and that the embodiments described herein apply equally regardless of the particular type of machine- or computer-readable media used to actually effect the distribution. Examples of machine-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", or the like means that a particular feature, design, structure, or characteristic described in connection with the embodiment is included in at least one embodiment of the disclosure. The appearances of, for example, the phrases "according to an embodiment", "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention, both independently and as an overall system, and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

What is claimed is:

1. A computer-implemented method comprising:
    receiving, by a computing system, at least one operation to be performed against a first data set and a second data set, the operation being received through an interface provided by the computing system, and being based at least in part on a Structured Query Language (SQL), wherein the first data set and the second data set are at least:
        stored in different database types;
        stored in independent storage environments; and
        managed by independent computing systems, including at least a first computing system and a different computing system;
    performing, by the computing system, at least one optimization with respect to the operation;
    executing, by the computing system, the operation using at least the first data and the second data based on accessing the first data directly from a first storage environment and accessing the second data directly from a different storage environment; and
    providing, by the computing system, a generated result upon executing the operation through the interface provided by the computing system, wherein the computing system, the first computing system, and the different computing system are each able to concurrently process, access, and create at least a portion of the generated result without combining the first data set and the second data set into a centralized data set prior to providing the generated result.

2. The computer-implemented method of claim 1, wherein the first data set is associated with a SQL database type, and wherein the second data set is associated with a NoSQL database type.

3. The computer-implemented method of claim 1, wherein the first data set and the second data set correspond to at least one of: a text file, a log file, a document file, an image file, an audio file, a video file, a spreadsheet file, an information source, or an information sink.

4. The computer-implemented method of claim 1, wherein the first data set is a first database table associated with the first database type, and wherein the second data set is a second database table associated with the second database type, and wherein executing, by the computing system, the operation further comprises:
    joining, by the computing system, the first database table managed by the first computing system and the second database table managed by the different computing system.

5. The computer-implemented method of claim 4, the method further comprising:
    receiving, by the computing system, at least one second operation to modify the joined first database table and the second database table; and
    creating, by the computing system, a new database table based at least in part on the modification of the joined first database table and the second database table, wherein the new database table is stored in a local data store managed by the computing system.

6. The computer-implemented method of claim 5, the method further comprising:
    receiving, by the computing system, at least one third operation to modify the joined first database table and the second database table; and
    modifying, by the computing system, the new database table stored in the local data store managed by the computing system.

7. The computer-implemented method of claim 1, wherein the first data set is a first database table associated with the first database type, and wherein the second data set is a text file, and wherein executing, by the computing system, the operation further comprises:
    joining, by the computing system, the first database table and the text file.

8. The computer-implemented method of claim 1, wherein the result is a database table, and wherein providing, by the computing system, the result further comprises:
    providing, by the computing system, the result through the interface, the result being a tabular representation of the database table.

9. The computer-implemented method of claim 1, wherein the operation performs at least in part a user-defined function (UDF) with at least one of the first computing system and the second computing system, wherein at least one of the first computing system and the second computing system is remote from the computing system.

10. The computer-implemented method of claim 1, the method further comprising:
inferring, by the computing system, a table schema based at least in part on the first data set, the second data set, or both.

11. The computer-implemented method of claim 1, the method further comprising:
creating, by the computing system, a script that includes the at least one operation in response to a request by a user that provided the operation.

12. The computer-implemented method of claim 1, wherein the computing system, the first computing system, and the different computing system are at least one of: a server, a mobile computing device, a computing system having varying access to network connectivity, a virtualized computing system, a non-virtualized computing system, embedded computing system, or special-purpose computing system.

13. The computer-implemented method of claim 1, the method further comprising:
receiving, by the computing system and through the interface, a first operation and a second operation to be performed by the computing system;
performing, by the computing system, at least one optimization with respect to the first operation;
executing, by the computing system, the first operation;
while the first operation is executing, performing, by the computing system, at least one optimization with respect to the second operation; and
executing, by the computing system, the second operation.

14. The computer-implemented method of claim 1, wherein performing, by the computing system, at least one optimization further comprises:
translating, by the computing system, the operation into a single native code representation.

15. The computer-implemented method of claim 14, the method further comprising:
optimizing, by the computing system, the single native code representation of the operation, wherein the optimization includes at least one of: register allocation, loop unrolling, inlining, or constant folding.

16. A computing system comprising:
at least one processor; and
a memory storing instructions that, when executed by the at least one processor, cause the computing system to perform:
receiving at least one operation to be performed on a first data set and a second data set, the operation being received through an interface provided by the computing system, and being based at least in part on a Structured Query Language (SQL), wherein the first data set and the second data set are at least;
stored in different database types;
stored in independent storage environments; and
managed by independent computing systems, including at least a first computing system and a different computing system;
performing at least one optimization based at least in part on the operation;
executing the operation using at least the first data and the second data based on accessing the first data directly from a first storage environment associated with the first computing system and accessing the second data directly from a second storage environment associated with the different computing system; and
providing a generated result upon executing the operation through the interface provided by the computing system, wherein the computing system, the first computing system, and the second computing system are each able to concurrently process, access, and create at least a portion of the generated result without combining the first data set and the second data set into a centralized data set prior to providing the generated result.

17. A computer-readable hardware storage medium including instructions that, when executed by at least one processor of a computing system, cause the computing system to perform:
receiving at least one operation to be performed using a first data set and a second data set, the operation being received through an interface provided by the computing system, and being based at least in part on a Structured Query Language (SQL), wherein the first data set and the second data set are at least;
stored in different database types;
stored in independent storage environments; and
managed by independent computing systems, including at least a first computing system and a different computing system;
performing at least one optimization based at least in part on the operation;
executing the operation using at least the first data and the second data based on accessing the first data directly from a first storage environment associated with the first computing system and accessing the second data directly from a second storage environment associated with the different computing system; and
providing a generated result upon executing the operation through the interface provided by the computing system, wherein the computing system, the first computing system, and the second computing system are each able to concurrently process, access, and create at least a portion of the generated result without combining the first data set and the second data set into a centralized data set prior to providing the generated result.

* * * * *